(12) United States Patent
Nomura

(10) Patent No.: US 9,494,835 B2
(45) Date of Patent: Nov. 15, 2016

(54) LIQUID CRYSTAL DISPLAY

(71) Applicant: Japan Display Inc., Tokyo (JP)

(72) Inventor: Morikazu Nomura, Tokyo (JP)

(73) Assignee: Japan Display Inc., Tokyo (JP)

( * ) Notice: Subject to any disclaimer, the term of this patent is extended or adjusted under 35 U.S.C. 154(b) by 37 days.

(21) Appl. No.: 14/686,040

(22) Filed: Apr. 14, 2015

(65) Prior Publication Data

US 2015/0309358 A1 Oct. 29, 2015

(30) Foreign Application Priority Data

Apr. 14, 2014 (JP) ................................. 2014-082754

(51) Int. Cl.
*G02F 1/1362* (2006.01)
*G02F 1/1339* (2006.01)
*G02F 1/1343* (2006.01)

(52) U.S. Cl.
CPC ..... *G02F 1/136286* (2013.01); *G02F 1/13394* (2013.01); *G02F 2001/134372* (2013.01); *G02F 2001/136295* (2013.01)

(58) Field of Classification Search
CPC ................ G02F 1/136286; G02F 1/13394; G02F 2001/134372; G02F 2001/136295
See application file for complete search history.

(56) References Cited

U.S. PATENT DOCUMENTS

| 8,958,042 | B2 | 2/2015 | Sonoda et al. |
| 2010/0201933 | A1 | 8/2010 | Sonoda et al. |
| 2013/0235294 | A1 | 9/2013 | Nomura |

FOREIGN PATENT DOCUMENTS

| JP | 2010-181786 A | 8/2010 |
| JP | 2013-186148 A | 9/2013 |

*Primary Examiner* — Donald Raleigh
*Assistant Examiner* — Kevin Quarterman
(74) *Attorney, Agent, or Firm* — Typha IP LLC

(57) ABSTRACT

To prevent or inhibit, a spacer section from coming close to the array substrate inside each of pixels, a liquid crystal display includes an auxiliary wiring provided to project toward the side of the opposite substrate from a surface of the array substrate, and the spacer section provided to project toward the side of the array substrate from a surface of the opposite substrate. The auxiliary wiring is arranged within a region provided with an extension portion in a liquid shielding section, and extends in an X-axis direction in a plan view, and a length in a Y-axis direction of the spacer section is larger than a width in the X-axis direction of the spacer section. The spacer section crosses the auxiliary wiring in a crossing region where the extension portion and an extension portion cross each other in a plan view.

10 Claims, 23 Drawing Sheets

LIQUID CRYSTAL DISPLAY

CROSS-REFERENCE TO RELATED APPLICATION

The present application claims priority from Japanese Patent Application No. 2014-082754 filed on Apr. 14, 2014, the content of which is hereby incorporated by reference into this application.

TECHNICAL FIELD OF THE INVENTION

The present invention relates to a liquid crystal display, and more particularly to a liquid crystal display including a plurality of pixels.

BACKGROUND OF THE INVENTION

A liquid crystal display includes an array substrate, an opposite substrate arranged to oppose the array substrate, and a liquid crystal layer sandwiched between the array substrate and the opposite substrate, for example. The array substrate or the opposite substrate includes a light shielding section having a lattice shape in a plan view. The light shielding section defines a plurality of pixels. The array substrate includes a thin film transistor (TFT) serving as a switching element.

In this liquid crystal display, an electric field is formed in the liquid crystal layer by applying a voltage between a pixel electrode provided in each of a plurality of pixels and a common electrode provided to be common to the plurality of pixels. Thus, in each of the pixels, display is performed based on image data. For example, an image is displayed outside the opposite substrate.

In this liquid crystal display, a spacer section is formed between the array substrate and the opposite substrate in order to maintain a spacing between the array substrate and the opposite substrate and maintain the thickness of the liquid crystal layer constant. The spacer section is fixed to the opposite substrate, for example. The spacer section is arranged to overlap the light shielding section in a plan view.

Japanese Patent Application Laid-Open No. 2013-186148 (Patent Literature 1) and Japanese Patent Application Laid-Open No. 2010-181786 (Patent Literature 2), for example, discuss a liquid crystal display in which a spacer section formed between an array substrate and an opposite substrate is arranged to overlap a light shielding section in a plan view.

In this liquid crystal display, the array substrate or the opposite substrate may be deflected by application of a force from the outside, so that the array substrate and the opposite substrate may shift from each other in a transverse direction, i.e., in a direction parallel to a surface of the array substrate or a surface of the opposite substrate. In such a case, a spacer section may come close to the surface of the array substrate in apart arranged inside each of pixels in a plan view, and an oriented film formed on the surface of the array substrate in the part arranged inside each of the pixels in a plan view may be damaged. As a result, light may leak from a damaged part of the oriented film.

The present invention has been made to solve a problem in the above-described conventional technique and is directed to providing a liquid crystal display capable of preventing or inhibiting, even if an array substrate and an opposite substrate shift from each other, a spacer section from coming close to a surface of the array substrate in a part arranged inside each of pixels.

SUMMARY OF THE INVENTION

The following is a brief description of an outline of the typical invention disclosed in the present application.

A liquid crystal display as an aspect of the present invention includes: a first substrate having a first main surface; a second substrate having a second main surface and arranged to oppose the first substrate so that the second main surface and the first main surface of the first substrate oppose each other; and a liquid crystal layer sandwiched between the first main surface of the first substrate and the second main surface of the second substrate. Further, the liquid crystal display includes a light shielding section provided to overlap the first substrate and the second substrate in a plan view and including a plurality of first extension portions extending in a first direction and a plurality of second extension portions extending in a second direction crossing the first direction in a plan view. Further, the liquid crystal display includes a plurality of pixels defined by the plurality of first extension portions and the plurality of second extension portions in a plan view. Further, the liquid crystal display includes: a first wiring provided to project toward a side of the second substrate from the first main surface of the first substrate; and a spacer section provided to project toward a side of the first substrate from the second main surface of the second substrate. The first wiring is arranged within a region provided with any one of the plurality of first extension portions, and extends in the first direction in a plan view, and a length of the spacer section in the second direction is larger than a width of the spacer section in the first direction. The spacer section is arranged to cross the first wiring in a crossing region where any one of the plurality of second extension portions and any one of the first extension portions cross each other in a plan view.

As another aspect of the present invention, the spacer section may be arranged within a region provided with any one of the second extension portions in a plan view. Further, as another aspect of the present invention, the light shielding section may include a light shielding portion for spacer section that shields the spacer section from light, and the spacer section may be arranged within a region provided with the light shielding portion for spacer section in a plan view. Furthermore, as another aspect of the present invention, the liquid crystal display may include a second wiring provided to project toward a side of the second substrate from the first main surface of the first substrate, and the second wiring may be arranged to cross the first wiring in the crossing region, and extend in the second direction in a plan view.

Further, as another aspect of the present invention, the liquid crystal display may include: each of a plurality of first electrodes, provided on the side of the first main surface of the first substrate, inside each of a plurality of pixels arranged in the first direction among the plurality of pixels; and a second electrode provided on the side of the first main surface of the first substrate to overlap each of the plurality of first electrodes in a plan view. At this time, the first wiring may be electrically connected to the second electrode, and an electric field may be formed between each of the plurality of first electrodes and the second electrode, so that an image is displayed.

Further, as another aspect of the present invention, the liquid crystal display may include: a plurality of gate wirings provided on the side of the first main surface of the first substrate, and extending in the first direction in a plan view; a plurality of source wirings provided on the side of the first main surface of the first substrate, and extending in the second direction in a plan view; and a plurality of transistors respectively arranged in a plurality of crossing parts where the plurality of gate wirings and the plurality of source wirings cross each other. At this time, the light shielding section may be provided in the second substrate.

Further, as another aspect of the present invention, the liquid crystal display may include: a plurality of gate wirings provided on the side of the first main surface of the first substrate, and extending in the second direction in a plan view; a plurality of source wirings provided on the side of the first main surface of the first substrate, and extending in the first direction in a plan view; and a plurality of transistors respectively arranged in a plurality of crossing parts where the plurality of gate wirings and the plurality of source wirings cross each other. At this time, the light shielding section is provided in the second substrate.

Further, as another aspect of the present invention, the liquid crystal display may include a third electrode extending in the second direction in a plan view, and an input position is detected based on a capacitance between the third electrode and the first wiring.

Further, as another aspect of the present invention, the liquid crystal display may include: a plurality of gate wirings provided on the side of the first main surface of the first substrate, and extending in the second direction in a plan view; and a first insulating film provided on the side of the first main surface of the first substrate to cover the plurality of gate wirings. Further, the liquid crystal display may include a plurality of source wirings provided on the first insulating film, and extending in the first direction in a plan view. At this time, the plurality of gate wirings may be respectively arranged within regions provided with each of the plurality of second extension portions in a plan view, and the plurality of source wirings may be respectively arranged within regions provided with each of the plurality of first extension portions in a plan view. Further, the liquid crystal display may include: a plurality of openings respectively provided by penetrating the first insulating film in parts overlapping the plurality of pixels in a plan view; and a second insulating film provided to be embedded in each of the plurality of openings and to cover the first insulating film and the plurality of source wirings. Further, the liquid crystal display may include a plurality of recesses respectively formed on an upper surface of the second insulating film in parts overlapping each of the plurality of openings in a plan view.

Further, as another aspect of the present invention, the liquid crystal display may include: each of a plurality of first electrodes, provided on the side of the first main surface of the first substrate, inside each of a plurality of pixels arranged in the first direction among the plurality of pixels; and a second electrode provided on the side of the first main surface of the first substrate to overlap each of the plurality of pixels arranged in the first direction in a plan view. At this time, the second electrode may be provided apart from each of the plurality of first electrodes in a plan view, the first wiring may be may be formed between each of the plurality of first electrodes and the second electrode, so that an image is displayed.

BRIEF DESCRIPTIONS OF THE DRAWINGS

DESCRIPTIONS OF THE PREFERRED EMBODIMENTS

Figure 1:
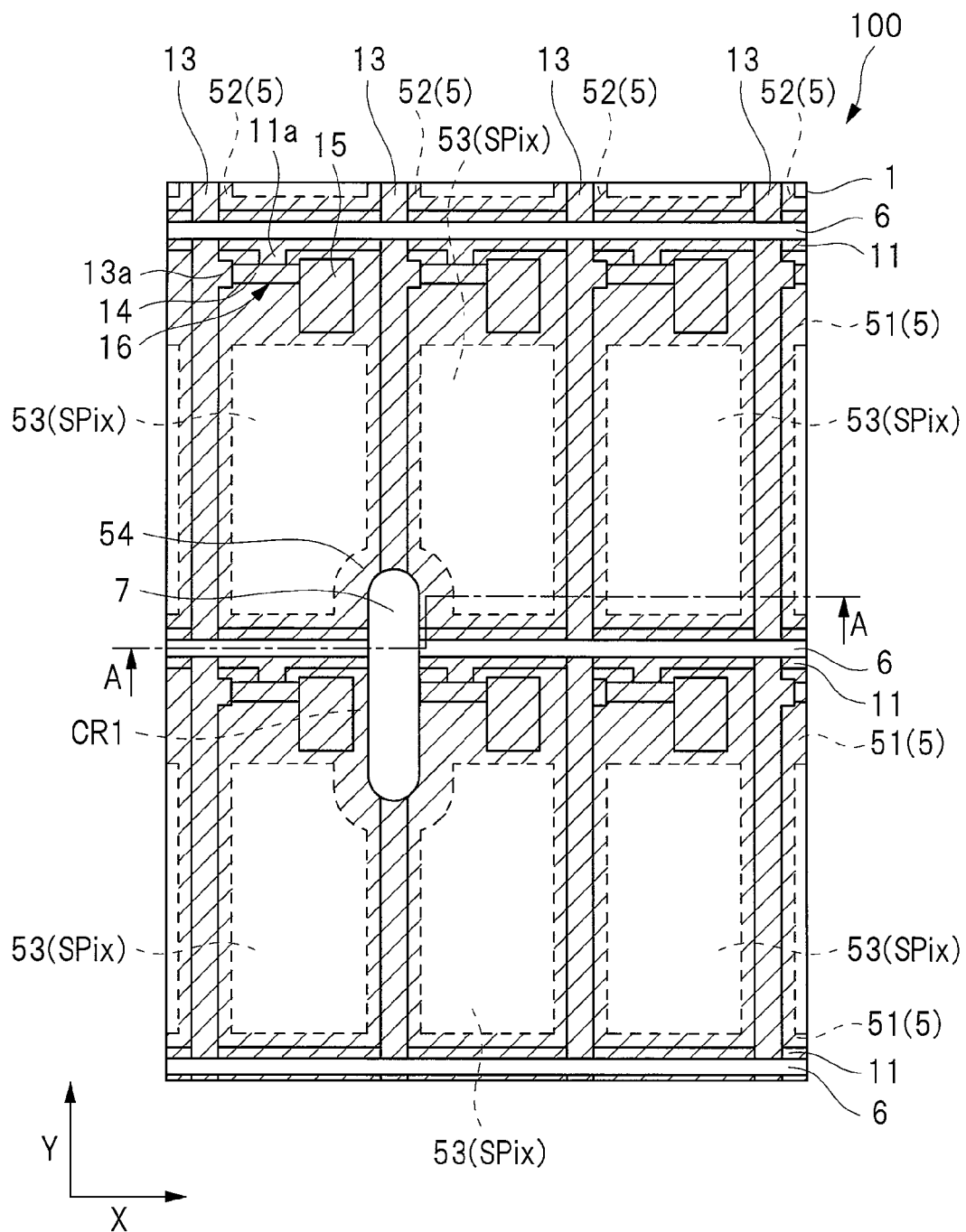
FIG. 1 is a plan view illustrating an example of a liquid crystal display according to a first embodiment.

Hereinafter, embodiments of the present invention will be described with reference to drawings.

Note that the disclosures are provided by way of example, and any suitable variations easily conceived by a person with ordinary skill in the art while pertaining to the gist of the invention are of course included in the scope of the present invention. Further, in the drawings, widths, thicknesses and shapes of respective components may be schematically illustrated in comparison with the embodiments for the purpose of making the description more clearly understood, but these are merely examples, and do not limit the interpretations of the present invention.

Further, in the specification and drawings, elements which are similar to those already described with respect to previous drawings are denoted by the same reference characters, and detailed descriptions thereof will be suitably omitted.

Further, in some drawings used in the embodiments, hatching is omitted in some cases even in a cross-sectional view so as to make the drawings easy to see. Still further, hatching is used in some cases even in a plan view so as to make the drawings easy to see.

First Embodiment

Liquid Crystal Display

A liquid crystal display 100 according to a first embodiment of the present invention will be described with reference to the drawings. A Fringe Field Switching (FFS)-mode liquid crystal display serving as a color-display transverse electric field system will be described as an example of the liquid crystal display. The transverse electric field system is a system in which a pair of electrodes is provided while being insulated from each other on the side of a liquid crystal layer of either one of an array substrate and an opposite substrate, and an electric field in a substantially transverse direction is formed in the liquid crystal layer. An FFS mode is one transverse electric field system in which the pair of electrodes is arranged to overlap each other in a plan view.

First, a schematic configuration of the liquid crystal display 100 according to the first embodiment will be described with reference to FIGS. 1 to 4.

Figure 2:
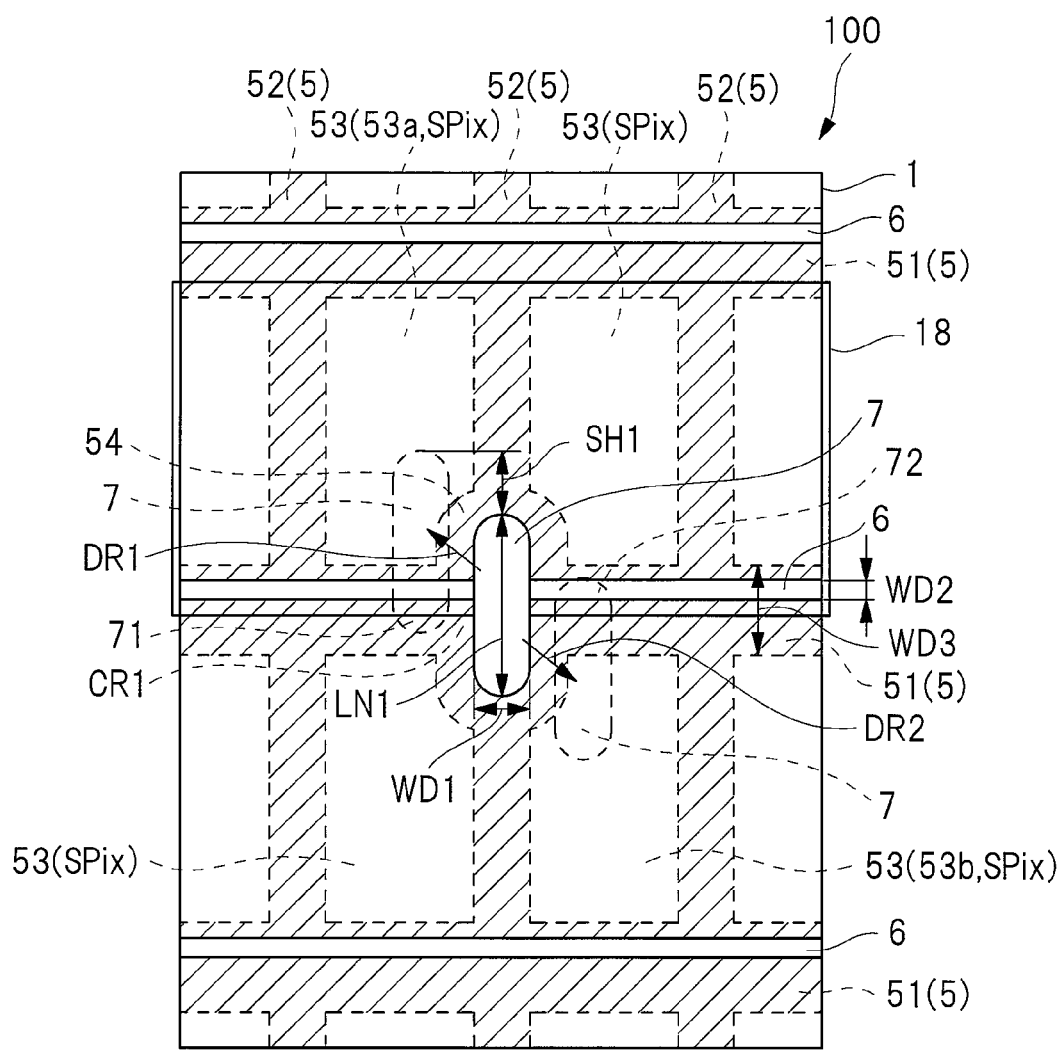
FIG. 2 is a plan view illustrating an example of the liquid crystal display according to the first embodiment.
Figure 3:
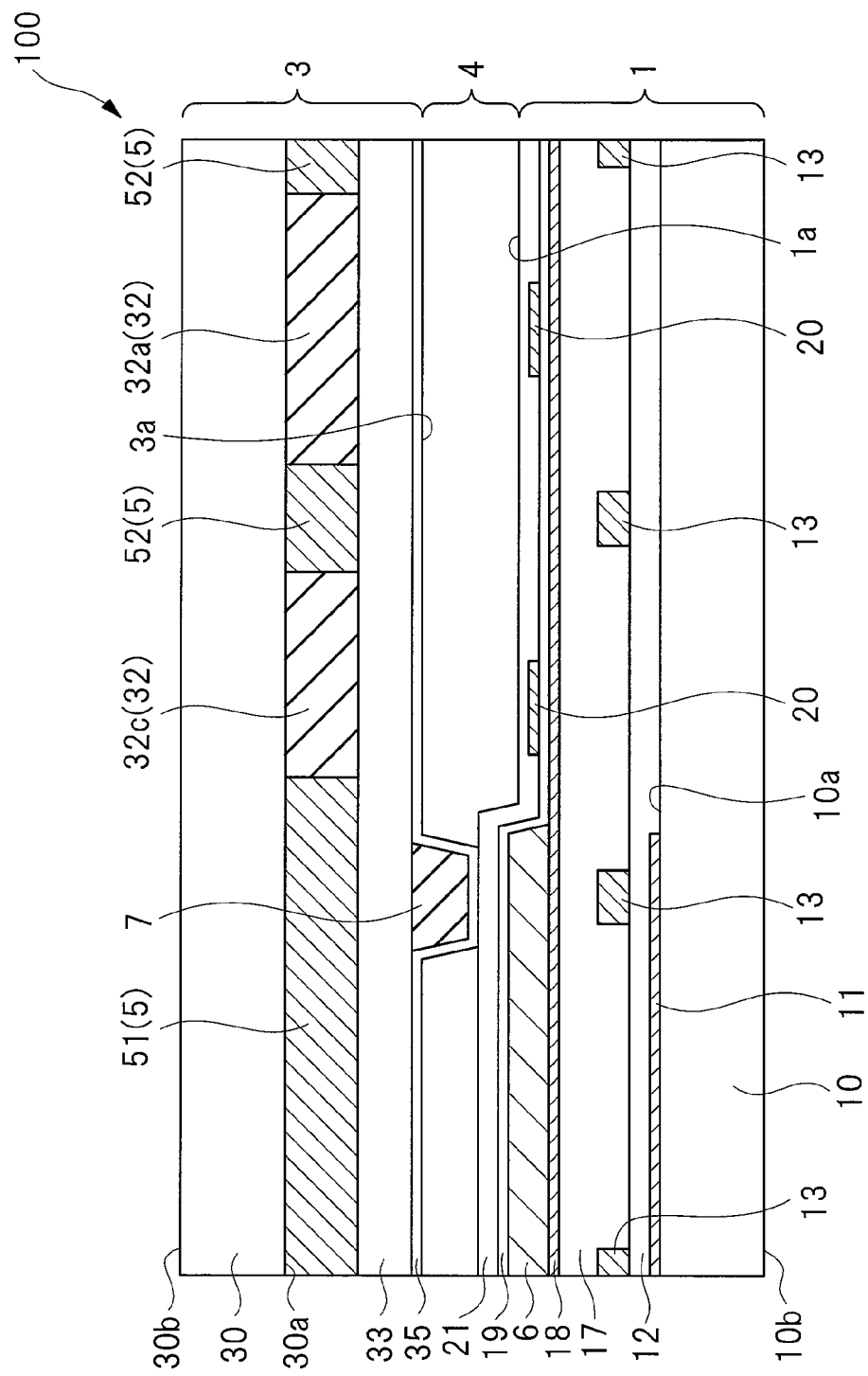
FIG. 3 is a cross-sectional view illustrating an example of the liquid crystal display according to the first embodiment.
Figure 4:
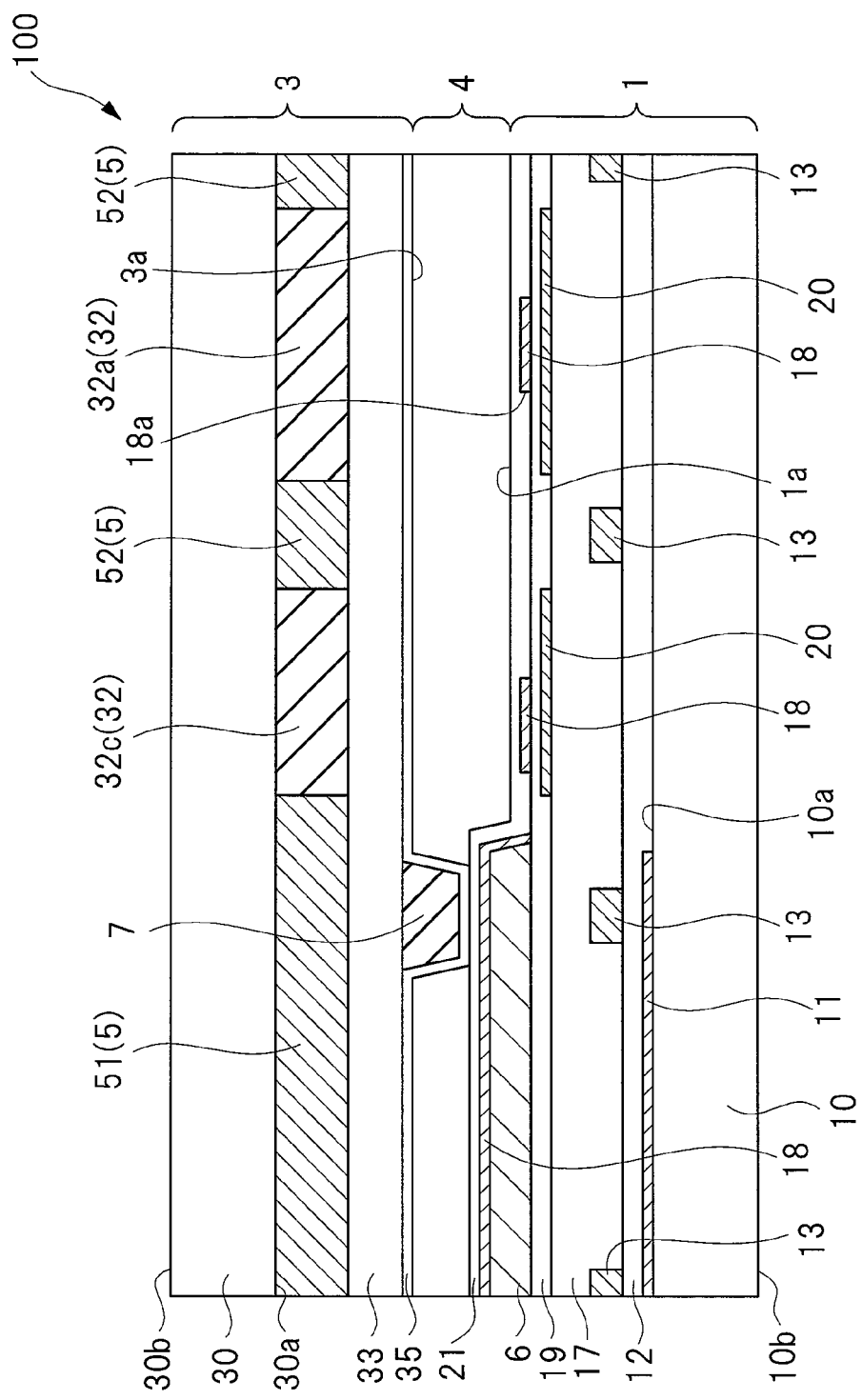
FIG. 4 is a cross-sectional view illustrating another example of the liquid crystal display according to the first embodiment.

FIGS. 1 and 2 are plan views illustrating an example of the liquid crystal display according to the first embodiment. FIG. 3 is a cross-sectional view illustrating an example of the liquid crystal display according to the first embodiment. FIG. 4 is a cross-sectional view illustrating another example of the liquid crystal display according to the first embodiment. FIGS. 3 and 4 are cross-sectional views along a line A-A illustrated in FIG. 1. FIGS. 1 and 2 illustrate a state where the liquid crystal display 100 is seen through by removing a part, other than a light shielding section 5 and a spacer section 7, of an opposite substrate 3, and a liquid crystal layer 4 for ease of understanding. In FIGS. 1 and 2, illustration of a part of an array substrate 1 is omitted for ease of understanding.

As illustrated in FIGS. 1 to 3, the liquid crystal display 100 according to the first embodiment includes the array substrate 1, the opposite substrate 3, and the liquid crystal layer 4. The array substrate 1 has a surface 1a serving as a main surface, and the opposite substrate 3 has a surface 3a serving as a main surface. The opposite substrate 3 is arranged to oppose the array substrate 1 so that the surface 3a of the opposite substrate 3 and the surface 1a of the array substrate 1 oppose each other. The liquid crystal layer 4 is sandwiched between the surface 1a of the array substrate 1 and the surface 3a of the opposite substrate 3.

The liquid crystal display 100 according to the first embodiment includes the light shielding section 5. The light shielding section 5 is provided to overlap the array substrate 1 and the opposite substrate 3 in a plan view, and has a light shielding property for blocking light. That is, the light shielding section 5 blocks incident light, which has been incident on the liquid crystal layer 4 from a light source, for example, so that the incident light does not reach the liquid crystal layer 4. Alternatively, the light shielding section 5 blocks transmitted light, which has been transmitted through the liquid crystal layer 4 after being incident thereon from a light source, for example, so that the transmitted light does not reach a viewer. The light shielding section 5 can include a light shielding film referred to as a black matric, which is provided in the array substrate 1 or the opposite substrate 3, for example. Alternatively, the light shielding section 5 can include a wiring pattern having a light shielding property such as a gate wiring 11 or a source wiring 13, described below, provided in the array substrate 1, for example.

In the specification of this application, "in a plan view" means a case "viewed from a direction perpendicular to the surface 1a of the array substrate 1 or viewed from a direction perpendicular to the surface 3a of the opposite substrate 3".

A case where the light shielding section 5 is composed of a light shielding film provided in the opposite substrate 3 will be exemplified below. As illustrated in FIG. 1, two directions crossing each other and preferably perpendicular to each other in a plan view are respectively an X-axis direction and a Y-axis direction. At this time, the light shielding section 5 includes a plurality of extension portions 51 extending in the X-axis direction and arranged apart from one another in the Y-axis direction, and a plurality of extension portions 52 extending in the Y-axis direction and arranged apart from one another in the X-axis direction.

The liquid crystal display 100 according to the first embodiment has a plurality of sub-pixels SPix. The plurality of sub-pixels SPix are defined by the plurality of extension portions 51 included in the light shielding section 5 and the plurality of extension portions 52 included in the light shielding section 5. That is, the plurality of sub-pixels SPix are respectively provided in a plurality of opening regions 53 defined by the plurality of extension portions 51 included in the light shielding section 5 and the plurality of extension portions 52 included in the light shielding section 5. In this case, the opening region 53 is an opening region formed in the light shielding section 5. Therefore, the plurality of sub-pixels SPix are arranged in a matrix shape in the X-axis direction and the Y-axis direction, and the plurality of opening regions 53 are arranged in a matrix shape in the X-axis direction and the Y-axis direction.

Each of the plurality of sub-pixels SPix displays any one of three colors, e.g., red (R), green (G), and blue (B). At this time, the three sub-pixels SPix, which respectively display red (R), green (G), and blue (B), constitute one pixel.

In the specification of this application, the sub-pixels SPix and the opening regions 53 in a case where the light shielding section 5 is provided in the opposite substrate 3 mean regions defined by the plurality of extension portions 51 and the plurality of extension portions 52 when the array substrate 1 and the opposite substrate 3 do not shift from each other.

The liquid crystal display 100 is not limited to three-color display. For example, sub-pixels SPix in two or less colors can also constitute one pixel. Alternatively, sub-pixels SPix in four or more colors can also constitute one pixel (the same is true for each of embodiments described below).

The array substrate 1 includes a transparent substrate 10 as a base. The transparent substrate 10 has a surface 10a serving as one main surface and a reverse surface 10b serving as a surface on the opposite side of the surface 10a and the other main surface. The transparent substrate 10 is composed of glass, quartz, or plastic having a transparent insulating property.

A plurality of gate wirings 11 are provided on the surface 10a of the transparent substrate 10. That is, the plurality of gate wirings 11 are provided on the side of the surface 1a of the array substrate 1. The plurality of gate wirings 11 are respectively arranged within regions provided with each of the plurality of extension portions 51, and extend in the X-axis direction in a plan view. Each of the plurality of gate wirings 11 is composed of an opaque metal such as aluminum (Al) or molybdenum (Mo). A gate electrode 11a extends from the gate wiring 11 in a crossing part between a source wiring 13 described below and the gate wiring 11.

In the specification of this application, "provided on the side of the surface 1a of the array substrate 1" means a case "provided in direct contact with the surface 10a of the transparent substrate 10 on the surface 10a", and a case "provided apart from the surface 10a of the transparent substrate 10 above the surface 10a".

An insulating film 12 serving as a gate insulating film is provided to cover the gate wirings 11 and the gate electrodes 11a. That is, the insulating film 12 is provided on the side of the surface 1a of the array substrate 1. The insulating film 12 is a transparent insulating film composed of silicon nitride or silicon oxide, for example.

A plurality of source wirings 13 are provided on the insulating film 12. That is, the plurality of source wirings 13 are provided on the side of the surface 1a of the array substrate 1. The plurality of source wirings 13 are respectively arranged within regions provided with each of the plurality of extension portions 52, and extend in the Y-axis direction in a plan view. Each of the plurality of source wirings 13 is composed of an opaque metal such as aluminum (Al) or molybdenum (Mo). A source electrode 13a extends from the source wiring 13 in the crossing part between the source wiring 13 and the gate wiring 11.

A semiconductor layer 14 is provided on the insulating film 12 in parts respectively overlapping the gate electrodes 11a in a plan view. The semiconductor layer 14 is composed of amorphous silicon or polycrystalline silicon (polysilicon), for example. The above-described source electrode 13a contacts a part of the semiconductor layer 14.

Drain electrodes 15 composed of the same material as that for the source wirings 13 and the source electrodes 13a are provided on the insulating film 12. The drain electrode 15 is arranged in close to the source electrode 13a, and partially contacts the semiconductor layer 14.

Preferably, the drain electrode 15 includes a conductive film formed in the same layer as a conductive film included in the source wiring 13. Thus, the drain electrode 15 can be formed in a process identical to a process for forming the source wiring 13.

Therefore, a plurality of thin film transistors (TFT) 16 are respectively arranged and provided in a plurality of crossing parts where the plurality of gate wirings 11 and the plurality of source wirings 13 cross each other. Each of the plurality of TFTs 16 is a switching element constituted by the gate electrode 11a, the insulating film 12, the source electrode 13a, the semiconductor layer 14, and the drain electrode 15. The plurality of TFTs 16 are provided on the side of the surface 1a of the array substrate 1.

Further, an interlayer resin film 17 is provided to cover the plurality of source wirings 13, the plurality of TFTs 16, and an exposed part of the insulating film 12. The interlayer resin film 17 is a flattening film, and covers the plurality of source wirings 13, the plurality of TFTs 16, and the exposed part of the insulating film 12 while flattening an uneven surface including respective upper surfaces of the plurality of source wirings 13, the plurality of TFTs 16, and the insulating film 12. The interlayer resin film 17 is composed of a transparent resin material such as a photoresist.

Common electrodes 18 are provided on the interlayer resin film 17. That is, the common electrodes 18 are provided on the side of the surface 1a of the array substrate 1. The common electrode 18 is composed of a transparent conductive material such as indium tin oxide (ITO) or indium zinc oxide (IZO). The common electrodes 18 are continuously and integrally provided to respectively overlap the plurality of sub-pixels SPix in a plan view. In an example illustrated in FIG. 2, the common electrodes 18 are continuously and integrally provided to respectively overlap the plurality of sub-pixels SPix arranged in the X-axis direction. In the example illustrated in FIG. 2, the common electrodes 18 are provided to respectively overlap a plurality of pixel electrodes 20, which will be described below, arranged in the X-axis direction, and extend in the X-axis direction in a plan view.

The common electrodes 18 may be continuously and integrally provided, when the plurality of sub-pixels SPix arranged in the X-axis direction constitute a sub-pixel group, to respectively overlap a plurality of sub-pixel groups arranged in the Y-axis direction. Alternatively, the single common electrode 18 may be provided to overlap the plurality of sub-pixels SPix arranged in a matrix shape in the X-axis direction and the Y-axis direction.

A plurality of auxiliary wirings 6 are provided on the interlayer resin film 17. That is, the plurality of auxiliary wirings 6 are provided on the side of the surface 1a of the array substrate 1. Each of the plurality of auxiliary wirings 6 is composed of a metal film. The metal film is composed of an opaque metal such as aluminum (Al) or molybdenum (Mo).

The plurality of auxiliary wirings 6 are respectively arranged within regions provided with each of the plurality of extension portions 51, and extend in the X-axis direction in a plan view. Each of the plurality of auxiliary wirings 6 is provided to project toward the side of the opposite substrate 3 from the surface 1a of the array substrate 1. The surface 1a of the array substrate 1 means a surface of the oriented film 21 provided on the side of the surface 10a of the transparent substrate 10 in a part not provided with the auxiliary wirings 6.

The auxiliary wirings 6 need not be respectively provided within all the regions provided with each of the plurality of extension portions 51, or may be provided in every other one or every other one or more of the regions. That is, the auxiliary wiring 6 may be arranged within the region provided with any one of the plurality of extension portions 51.

As an example is illustrated in FIG. 2, the common electrode 18 is provided so that a peripheral edge of the common electrode 18 overlaps any one of the plurality of extension portions 51 in a plan view. As illustrated in FIG. 3, any one of the plurality of auxiliary wirings 6 is provided on the common electrode 18 in a part overlapping any one of the extension portions 51 in a plan view. Therefore, anyone of the auxiliary wirings 6 is electrically connected to the common electrode 18.

The auxiliary wiring 6 has a lower electric resistivity than the electric resistivity of the transparent conductive material such as ITO or IZO included in the common electrode 18. Therefore, the auxiliary wiring 6 is electrically connected to the common electrode 18, so that the electric resistance of the common electrode 18 can be reduced. Thus, the performance of the liquid crystal display can be improved, such as that a time constant can be shortened.

An inter-electrode insulating film 19 is provided to cover the common electrodes 18. That is, the inter-electrode insulating film 19 is provided on the side of the surface 1a of the array substrate 1. The inter-electrode insulating film 19 is a transparent insulating film composed of silicon nitride or silicon oxide, for example.

The plurality of pixel electrodes 20 are provided on the inter-electrode insulating film 19. Each of the plurality of pixel electrodes 20 is composed of a transparent conductive material such as ITO or IZO. Each of the plurality of pixel electrodes 20 is provided on the side of the surface 1a of the array substrate 1 inside each of the plurality of sub-pixels SPix in a plan view. Therefore, the common electrodes 18 are provided to respectively overlap the plurality of pixel electrodes 20 arranged in the X-axis direction, for example, in a plan view. The common electrode 18 and the pixel electrode 20 oppose each other via the inter-electrode insulating film 19 inside each of the plurality of sub-pixels SPix.

The inter-electrode insulating film 19 is provided to cover the auxiliary wirings 6 provided on the common electrodes 18 within the region provided with each of the extension portion 51 in a plan view.

A contact hole (not illustrated), which penetrates the inter-electrode insulating film 19 and the interlayer resin film 17 to reach the drain electrode 15, is formed, and the pixel electrode 20 is electrically connected to the drain electrode 15 exposed to the bottom of the contact hole in a plan view.

Although the pixel electrode 20 is provided above the common electrode 18 in the example illustrated in FIG. 3, the common electrode 18 may be provided above the pixel electrode 20. Such an example is illustrated in FIG. 4. In the example illustrated in FIG. 4, an opening 18a is formed in the common electrode 18. In the example illustrated in FIG. 4, the common electrode 18 is provided on the auxiliary wiring 6. That is, the auxiliary wiring 6 may be provided under the common electrode 18.

For ease of understanding, illustration of the pixel electrodes 20 is omitted in FIGS. 1 and 2. In FIGS. 3 and 4, the pixel electrode 20 provided inside each of the sub-pixels SPix is illustrated as the one including only one extension portion extending in the Y-axis direction, for example. However, the liquid crystal display according to the first embodiment is an FFS-mode liquid crystal display. Thus, the pixel electrode 20 may have a come-tooth shape including a plurality of extension portions, i.e., comb teeth extending in the Y-axis direction and arranged in the X-axis direction, for example, in a plan view (the same is true for a second embodiment and a third embodiment, described below). At this time, a fringe electric field is formed between the pixel electrode 20 and the common electrode 18 via a slit provided between the two extension portions adjacent to each other, i.e., the comb teeth, so that an oriented state of a liquid crystal in the liquid crystal layer 4 changes (the same is true for the second embodiment and the third embodiment).

An oriented film 21 is provided to cover the pixel electrodes 20 and an exposed part of the inter-electrode insulating film 19. That is, the oriented film 21 is provided on the side of the surface 1a of the array substrate 1. The oriented film 21 is composed of polyimide, for example. The oriented film 21 is subjected to rubbing processing in a positive direction in the Y-axis direction illustrated in FIG. 1, for example.

The opposite substrate 3 includes a transparent substrate 30 as a base. The transparent substrate 30 has a surface 30a serving as one main surface and a reverse surface 30b serving as a surface on the opposite side of the substrate 30a and the other main surface. The transparent substrate 30 is composed of glass, quartz, or plastic having a transparent insulating property. The transparent substrate 30 is arranged to oppose the transparent substrate 10 so that the surface 10a of the transparent substrate 10 and the surface 30a of the transparent substrate 30 oppose each other.

The light shielding section 5 is provided on the surface 30a of the transparent substrate 30. That is, the light shielding section 5 is provided on the side of the surface 3a of the opposite substrate 3. The light shielding section 5 is provided to overlap each of the plurality of gate wirings 11 and each of the plurality of source wirings 13 in a plan view. The light shielding section 5 has a light shielding property for blocking light, is composed of resin or a metal, for example, and is referred to as a black matrix. As described above, the light shielding section 5 includes the plurality of extension portions 51 extending in the X-axis direction and arranged apart from one another in the Y-axis direction, and the plurality of extension portions 52 extending in the Y-axis direction and arranged apart from one another in the X-axis direction in a plan view. As described above, the plurality of extension portions 51 are provided so that the gate wirings 11 are respectively arranged within the regions provided with each of the plurality of extension portions 51 in a plan view. The plurality of extension portions 52 are provided so that the source wirings 13 are respectively arranged within the regions provided with each of the plurality of extension portions 52 in a plan view.

In the specification of this application, "provided on the side of the surface 3a of the opposite substrate 3" includes a case "provided in direct contact with the surface 30a of the transparent substrate 30", and a case "arranged apart from the surface 30a of the transparent substrate 30".

The width of the extension portion 51 in the Y-axis direction is larger than the width of the extension portion 52 in the X-axis direction. At this time, the TFT 16 provided in the crossing part between the gate wiring 11 and the source wiring 13 can be arranged within the region provided with the extension portion 51.

A plurality of color filter layers 32 are provided on the surface 30a of the transparent substrate 30. That is, the plurality of color filter layers 32 are provided on the side of the surface 3a of the opposite substrate 3. The plurality of color filter layers 32 are respectively arranged inside the plurality of sub-pixels SPix in a plan view. In the plurality of sub-pixels SPix, the color filter layers 32, which transmit lights in different colors depending on the sub-pixels SPix, are respectively arranged. FIG. 3 illustrates the color filter layer 32a serving as a color filter layer 32 that transmits light in red (R), for example, and the color filter layer 32c serving as a color filter layer 32 that transmits light in blue (B), for example.

An overcoat layer 33 is provided to cover the light shielding section 5 and the plurality of color filter layers 32. That is, the overcoat layer 33 is provided on the side of the surface 3a of the opposite substrate 3. The overcoat layer 33 is composed of a transparent resin material such as a photoresist. The overcoat layer 33 flattens a step caused by each of the plurality of color filter layers 32. Alternatively, the overcoat layer 33 prevents impurities flowing out of either one of the light shielding section 5 and the plurality of color filter layers 32 from entering the liquid crystal layer 4.

The spacer section 7 is provided on the overcoat layer 33. That is, the spacer section 7 is provided on the side of the surface 3a of the opposite substrate 3. The spacer section 7 keeps a spacing between the array substrate 1 and the opposite substrate 3 constant and keeps the thickness of the liquid crystal layer 4 constant. The spacer section 7 is a photo spacer composed of a transparent resin material such as a photoresist.

The spacer section 7 is provided to project toward the side of the array substrate 1 from the surface 3a of the opposite substrate 3. The surface 3a of the opposite substrate 3 means a surface of an oriented film 35 provided on the side of the surface 30a of the transparent substrate 30 in a part not provided with the spacer section 7.

As illustrated in FIGS. 1 and 2, the spacer section 7 need not be provided around all the plurality of sub-pixels SPix. That is, for example, one spacer section 7 may be provided for the plurality of sub-pixels SPix arranged in the X-axis direction. Alternatively, one spacer section 7 may be provided for the plurality of sub-pixels SPix arranged in the Y-axis direction.

The oriented film 35 is provided to cover the spacer section 7 and the overcoat layer 33. That is, the oriented film 35 is provided on the side of the surface 3a of the opposite substrate 3. The oriented film 35 is composed of polyimide, for example. The oriented film 35 is subjected to rubbing processing in an opposite direction to the oriented film 21 provided in the array substrate 1.

The array substrate 1 and the opposite substrate 3 are arranged to oppose each other, i.e., oppositely arranged via the auxiliary wirings 6 and the spacer section 7. A sealing material (not illustrated) is provided between an outer peripheral part of the array substrate 1 and an outer peripheral part of the opposite substrate 3. An area between the array substrate 1 and the opposite substrate 3 oppositely arranged is filled with the liquid crystal layer 4.

By the above-described configuration, in the respective sub-pixels SPix, when the TFTs 16 are turned on, a voltage is applied to each of the plurality of pixel electrodes 20, so that an electric field is formed between the common electrode 18 and the pixel electrode 20, and an orientation of the liquid crystal in the liquid crystal layer 4 changes due to the formed electric field. Thus, light transmittance in the liquid crystal layer 4 changes, so that an image is displayed. A region where the common electrode 18 and each of the plurality of pixel electrodes 20 oppose each other via the inter-electrode insulating film 19 forms an auxiliary capacitance, and when the TFTs 16 are turned off, an electric field between the common electrode 18 and each of the plurality of pixel electrodes 20 is held for a predetermined period of time.

<Arrangement of Auxiliary Wiring and Spacer Section>

An arrangement of the auxiliary wiring and the spacer section in the liquid crystal display 100 according to the first embodiment and its effect will be described below with reference to FIGS. 1 to 3. The auxiliary wiring, which crosses the spacer section 7, among the plurality of auxiliary wirings 6 will be described below.

As described above, the auxiliary wiring 6 is arranged within the region provided with any one of the plurality of extension portions 51, and extends in the X-axis direction in a plan view. The auxiliary wiring 6 is electrically connected to the common electrode 18. The auxiliary wiring 6 is provided to project toward the side of the opposite substrate 3 from the surface 1a of the array substrate 1.

On the other hand, the spacer section 7 has a shape having a length in the Y-axis direction, e.g., an elliptical shape or a rectangular shape in a plan view. That is, the length LN1 of the spacer section 7 in the Y-axis direction is larger than the width WD1 of the spacer section 7 in the X-axis direction in a plan view. The spacer section 7 is arranged to cross the auxiliary wiring 6 in a crossing region CR1 where any one of the extension portions 51 and any one of the plurality of extension portions 52 cross each other in a plan view. Therefore, the length LN1 of the spacer section 7 in the Y-axis direction is larger than the width WD2 of the auxiliary wiring 6 in the Y-axis direction.

As described above, the spacer section 7 is provided to project toward the side of the array substrate 1 from the surface 3a of the opposite substrate 3.

If the auxiliary wirings 6 are not provided, the array substrate 1 or the opposite substrate 3 is deflected by application of a force from the outside during processes for manufacturing the liquid crystal display or during use of the liquid crystal display, for example, so that the array substrate 1 and the opposite substrate 3 may shift from each other in a transverse direction, i.e., in a direction parallel to the surface 1a of the array substrate 1 or the surface 3a of the opposite substrate 3. In such a case, the spacer section 7 comes close to the surface 1a of the array substrate 1 in the part arranged inside each of the sub-pixels SPix in a plan view. Thus, the oriented film 21 formed on the surface 1a of the array substrate 1 in the part arranged inside each of the sub-pixels SPix in a plan view may be damaged. As a result, light may leak from a damaged part of the oriented film 21.

In the specification of this application, "the spacer section 7 comes close to the surface 1a of the array substrate 1" means that the spacer section 7 contacts the surface 1a of the array substrate 1 or the spacer section 7 contacts the surface 1a of the array substrate 1 via the oriented film 35 in addition to approaching the surface 1a of the array substrate 1.

On the other hand, in the first embodiment, the auxiliary wirings 6 are provided, as illustrated in FIG. 2. FIG. 2 illustrates a case where the spacer section 7 shifts in an oblique direction DR1 from its original position, for example, by the array substrate 1 and the opposite substrate 3 shifting from each other in the transverse direction. In such a case, the center of the spacer section 7 overlaps the array substrate 1 in a part arranged within an opening region 53a serving as the opening region 53 in a plan view while an end 71 of the spacer section 7 overlaps the auxiliary wiring 6 in a plan view. Therefore, the spacer section 7 is supported by the auxiliary wiring 6. Thus, a spacing is still provided between the surface 1a of the array substrate 1 in the part arranged within the opening region 53a and the spacer section 7 in a plan view, so that both the surface 1a and the spacer section 7 do not contact each other.

FIG. 2 illustrates a case where the spacer section 7 shifts in an oblique direction DR2 from its original position, for example, by the array substrate 1 and the opposite substrate 3 shifting from each other in the transverse direction. In such a case, the center of the spacer section 7 overlaps the array substrate 1 in a part arranged within an opening region 53b serving as the opening region 53 in a plan view while an end 72 of the spacer section 7 overlaps the auxiliary wiring 6 in a plan view. Therefore, the spacer section 7 is supported by the auxiliary wiring 6. Thus, a spacing is still provided between the surface 1a of the array substrate 1 in the part arranged within the opening region 53b and the spacer section 7 in a plan view, so that both the surface 1a and the spacer section 7 do not contact each other.

Therefore, even if the array substrate 1 or the opposite substrate 3 is deflected by application of a force from the outside, and the array substrate 1 and the opposite substrate 3 shift from each other in the transverse direction, a state where the auxiliary wiring 6 and the spacer section 7 overlap each other in a plan view is maintained. Thus, the spacer section 7 is prevented or inhibited from coming close to the surface 1a of the array substrate 1 in the part arranged inside each of the sub-pixels SPix in a plan view. As a result, the oriented film 21 formed on the surface 1a can be prevented or inhibited from being damaged.

Letting SH1 be a maximum shift amount when the opposite substrate 3 shifts from the array substrate 1 most greatly toward one side in the Y-axis direction, the length LN1 of the spacer section 7 in the Y-axis direction preferably satisfies the following equation (1):

$$LN1 > SH1 + WD2 \quad (1)$$

More preferably, the length LN1 is larger than twice of the maximum shift amount SH1. Still more preferably, when the width of the extension portion 51 is WD3, the length LN1 satisfies the following equation (2):

$$LN1 > 2SH1 + WD3 \quad (2)$$

In this case, when the opposite substrate 3 shifts from the array substrate 1 in the Y-axis direction, the spacer section 7 can be more reliably prevented from coming close to the surface 1a of the array substrate 1 in the part arranged inside each of the sub-pixels SPix as the length LN1 increases.

More specifically, in the first embodiment, even if the array substrate 1 and the opposite substrate 3 shift from each other in the transverse direction, previously assuming that the array substrate 1 and the opposite substrate 3 shift from each other in the transverse direction during manufacturing processes or during use, the spacer section 7 is prevented or inhibited from coming close to the surface of the array substrate 1 (the same is true for each of the embodiments described below).

In a technique discussed in Patent Literature 1, a liquid crystal display has a projection provided to project from a surface of an array substrate. The array substrate and an opposite substrate are oppositely arranged via a spacer section provided in the opposite substrate and the projection provided on the array substrate.

In the technique discussed in Patent Literature 1, to form the projection on the surface of the array substrate, the organic insulating film formed to cover a source line needs to be half-etched, leaving a part to be the projection, by half-exposing and then developing the organic insulating film Therefore, the number of manufacturing processes increases by an increase in the number of exposure times for providing the projection.

Alternatively, in the technique discussed in Patent Literature 1, to form the projection on the surface of the array substrate, a film other than the organic insulating film needs to be formed, as the projection, on the organic insulating film formed to cover the source line. Therefore, the number of manufacturing processes increases by an increase in the number of times for forming the film for providing the projection.

On the other hand, in the first embodiment, the auxiliary wiring 6 electrically connected to the common electrode 18 is provided to project from the surface 1a of the array substrate 1. That is, the auxiliary wiring 6 also serves as a projection for supporting the spacer section 7 provided in the opposite substrate 3. Therefore, a process for providing the projection need not be individually performed. Thus, the number of processes for manufacturing the liquid crystal display can be more reduced than in the technique discussed in Patent Literature 1 (the same is true for each of modification examples, described below, of the first embodiment).

The auxiliary wiring 6 is composed of a metal film Thus, accuracies in the thickness and the width of the projection are more improved and the hardness of the projection is more increased than when the projection provided on the surface 1a of the array substrate 1 is composed of an organic film, in the technique discussed in Patent Literature 1. Therefore, a spacing between the surface 1a of the array substrate 1 and the surface 3a of the opposite substrate 3 can be more accurately maintained than in the technique discussed in Patent Literature 1 (the same is true for each of the modification examples of the first embodiment).

In a technique discussed in Patent Literature 2, when a TFT substrate or an opposite substrate receives pressing pressure from the outside, a leading end of a columnar spacer provided on the opposite substrate cuts into a stopper including a bus electrode provided in the TFT substrate and ITO for projection, to prevent the columnar spacer from moving in a transverse direction.

More specifically, in the technique discussed in Patent Literature 2, the stopper including the bus electrode and the ITO for projection cuts into the columnar spacer. Thus, a shift between the substrates is not allowed. If such an external force that the TFT substrate and the opposite substrate shift from each other in a transverse direction is exerted, a large stress is exerted between the stopper and the columnar spacer because the shift between the substrates is not allowed. Therefore, an abutment part between the stopper and the columnar spacer and its surroundings are damaged. Therefore, transmittance in the abutment part and the surroundings may significantly decrease.

On the other hand, in the first embodiment, the auxiliary wiring 6 and the spacer section 7 allow the spacer section 7 to slightly move in the transverse direction due to an external force, and prevent the spacer section 7 from coming close to the surface 1a of the array substrate 1 in the part arranged inside each of the sub-pixels SPix even if the spacer section 7 moves in that manner. Therefore, the spacer section 7 has a shape having a length in the Y-axis direction crossing the X-axis direction in which the auxiliary wiring 6 extends. That is, the length LN1 of the spacer section 7 in the Y-axis direction is larger than the width WD1 of the spacer section 7 in the X-axis direction.

Thus, when the opposite substrate 3 shifts from the array substrate 1 in the X-axis direction, even if the width WD1 of the spacer section 7 in the X-axis direction is small, the center of the spacer section 7 is supported by a part, located at a different position in the X-axis direction from a part, which originally supports the spacer section 7, of the auxiliary wiring 6. When the opposite substrate 3 shifts from the array substrate 1 in the Y-axis direction, even if the width WD2 of the auxiliary wiring 6 in the Y-axis direction is small, an end in the Y-axis direction of the spacer section 7 is supported by the part, which originally supports the spacer section 7, of the auxiliary wiring 6.

Therefore, even if the array substrate 1 and the opposite substrate 3 shift from each other in the transverse direction, the spacer section 7 can be prevented or inhibited from coming close to the surface 1a of the array substrate 1 in the part arranged inside each of the sub-pixels SPix without increasing the width WD1 of the spacer section 7 and the width WD2 of the auxiliary wiring 6. Therefore, an effect of preventing or inhibiting the spacer section 7 from coming close to the surface 1a of the array substrate 1 in the part arranged inside each of the sub-pixels SPix can be more increased than in the technique discussed in Patent Literature 2 (the same is true for each of the modification examples of the first embodiment).

The auxiliary wiring 6 does not cut into the spacer section 7. Thus, after an external force is removed, the array substrate 1 and the opposite substrate 3 return to a state prior to where they shift from each other in the transverse direction, i.e., a state where the center of the spacer section 7 is supported by the part, which originally supports the spacer section 7, of the auxiliary wiring 6.

As described above, the width of the extension portion 51 in the Y-axis direction is larger than the width of the extension portion 52 in the X-axis direction, for covering the TFT 16 provided in the crossing part between the gate wiring 11 and the source wiring 13. In other words, the width of the extension portion 52 in the X-axis direction is smaller than the width of the extension portion 51 in the Y-axis direction. Therefore, the width WD1 of the spacer section 7 in the X-axis direction may be substantially the same as the width of the extension portion 52 in the X-axis direction.

In such a case, the light shielding section 5 preferably includes a light shielding portion for spacer section 54 that shields the spacer section 7 from light, as illustrated in FIGS. 1 and 2. The spacer section 7 is arranged within a region provided with the light shielding portion for spacer section 54 in a plan view. More specifically, the width of the light shielding portion for spacer section 54 in the X-axis direction is larger than the width of the extension portion 52 in the X-axis direction and the width WD1 of the spacer section 7 in the X-axis direction. Thus, the light shielding portion for spacer section 54 can cover the entire spacer section 7 in a plan view.

In the liquid crystal display, it is important, from the viewpoint of improving the luminance of the image to be displayed, that a plurality of pixels are arranged in a matrix shape, and an area ratio of the opening regions formed in the light shielding section, i.e., an opening ratio in a display region where an image is displayed is improved. Particularly in a medium/small-sized liquid crystal display used in an electronic device such as a smartphone or a tablet terminal, it is liable to be difficult to ensure a high opening ratio because the pixels are made highly fine. Thus, it is important to improve the above-described opening ratio.

In the liquid crystal display 100 according to the first embodiment, the spacer section 7 can be prevented or inhibited from coming close to the surface 1a of the array substrate 1 in the part arranged inside each of the sub-pixels SPix without the width of the extension portion 51 or the width of the extension portion 52 being increased, and the luminance of the image displayed by the liquid crystal display 100 can be easily improved. If the liquid crystal display 100 according to the first embodiment is applied to the medium/small-sized liquid crystal display in which a high opening ratio is more difficult to be ensured because the pixels are made highly fine, an effect of easily improving the luminance of an image displayed by the liquid crystal display is further increased (the same is true for each of the embodiments described below).

<First Modification Example of Arrangement of Auxiliary Wiring and Spacer Section>

A first modification example of the arrangement of the auxiliary wiring and the spacer section in the liquid crystal display according to the first embodiment will be described below with reference to FIG. 5.

Figure 5:
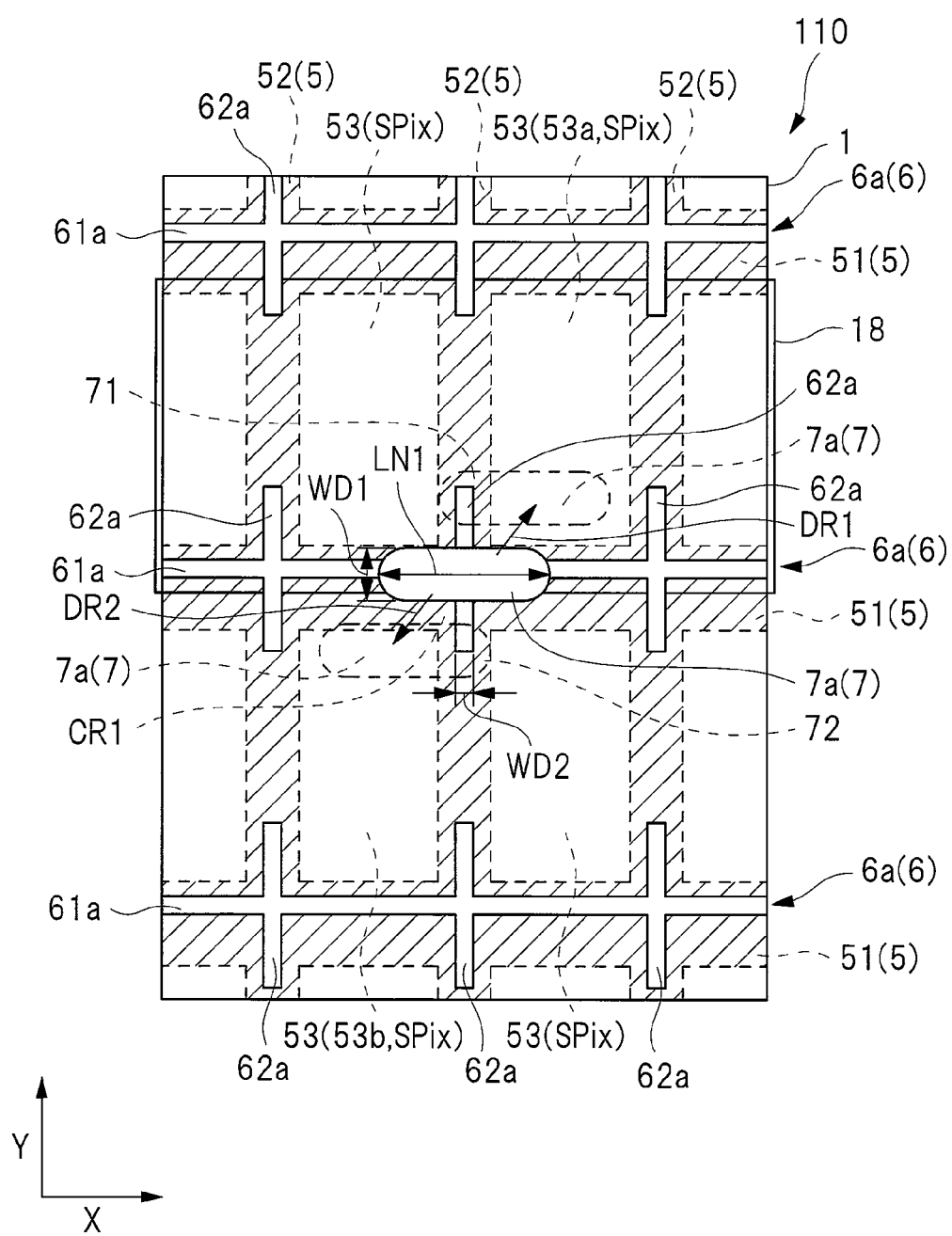
FIG. 5 is a plan view illustrating a first modification example of the liquid crystal display according to the first embodiment.

FIG. 5 is a plan view illustrating the first modification example of the liquid crystal display according to the first embodiment. FIG. 5 illustrates a state where a liquid crystal display in the first modification example is seen through by removing a part, other than a light shielding section 5 and a spacer section 7a, of an opposite substrate 3 and a liquid crystal layer 4. In FIG. 5, illustration of a part of an array substrate 1 is omitted.

In the liquid crystal display device 110 in the first modification example, common electrodes 18 are continuously and integrally provided to respectively overlap a plurality of sub-pixels SPix arranged in an X-axis direction, for example, in a plan view, like in the liquid crystal display 100 according to the first embodiment. Therefore, in the first modification example, the common electrodes 18 are provided to respectively overlap a plurality of pixel electrodes 20 arranged in the X-axis direction, for example, and extend in the X-axis direction in a plan view, like in the first embodiment.

In the first modification example, a plurality of auxiliary wirings 6a serving as a plurality of auxiliary wirings 6 are provided to respectively overlap regions provided with each of a plurality of extension portions 51 in a plan view. The plurality of auxiliary wirings 6a are respectively electrically connected to the plurality of common electrodes 18, for example.

In the first modification example, each of the plurality of auxiliary wirings 6a includes an auxiliary wiring 61a and a plurality of auxiliary wirings 62a. The auxiliary wiring 6a, arranged to cross the spacer section 7a in a plan view, among the plurality of auxiliary wirings 6a will be described below.

The auxiliary wiring 61a is arranged within the region provided with any one of the plurality of extension portions 51, and extends in the X-axis direction in a plan view, like the auxiliary wiring 6 in the first embodiment. The auxiliary wiring 61a is provided to project toward the side of the opposite substrate 3 from the surface 1a of the array substrate 1, like the auxiliary wiring 6 illustrated in FIG. 3.

On the other hand, the plurality of auxiliary wirings 62a are respectively arranged within regions provided with each of a plurality of extension portions 52, and extend in a Y-axis direction in a plan view. Each of the plurality of auxiliary wirings 62a is provided to project toward the side of the opposite substrate 3 from the surface 1a of the array substrate 1, like the auxiliary wirings 6 illustrated in FIG. 3. The plurality of auxiliary wirings 62a are arranged to respectively cross the auxiliary wirings 61a in crossing regions where any one of the extension portions 51 and the plurality of extension portions 52 cross each other in a plan view.

On the other hand, in the first modification example, the spacer section 7a serving as a spacer section 7 is provided. In the first modification example, the spacer section 7a has a shape having a length in the X-axis direction, e.g., an elliptical shape or a rectangular shape in a plan view, unlike in the first embodiment. That is, the length LN1 of the spacer section 7a in the X-axis direction is larger than the width WD1 of the spacer section 7a in the Y-axis direction in a plan view. The auxiliary wiring 61a is arranged to cross any one of the plurality of auxiliary wirings 62a in a crossing region CR1 where any one of the extension portions 51 and any one of the plurality of extension portions 52 cross each other, and extends in the X-axis direction in a plan view. The spacer section 7a is arranged to cross any one of the auxiliary wirings 62a in the crossing region CR1 in a plan view. Therefore, the length LN1 of the spacer section 7a in the X-axis direction is larger than the width WD2 of the auxiliary wiring 62a in the X-axis direction.

The spacer section 7a is provided to project toward the side of the array substrate 1 from the surface 3a of the opposite substrate 3, like the spacer section 7 illustrated in FIG. 3. The spacer section 7a is arranged within the region provided with any one of the extension portions 51 in a plan view.

As illustrated in FIG. 5, even if the spacer section 7a shifts in an oblique direction DR1 from its original position, for example, an end 71 of the spacer section 7a overlaps the auxiliary wiring 62a in a plan view. Thus, the spacer section 7a does not come close to the surface 1a of the array substrate 1 in apart arranged within an opening region 53a in a plan view. Further, even if the spacer section 7a shifts in an oblique direction DR2 from its original position, for example, an end 72 of the spacer section 7a overlaps the auxiliary wiring 62a in a plan view. Thus, the spacer section 7a does not come close to the surface 1a of the array substrate 1 in a part arranged within an opening region 53b in a plan view.

Therefore, even if the array substrate 1 or the opposite substrate 3 is deflected due to application of a force from the outside, and the array substrate 1 and the opposite substrate 3 shift from each other in a transverse direction, a state where the auxiliary wiring 62a and the spacer section 7a overlap each other in a plan view is maintained. Thus, the spacer section 7a is prevented or inhibited from coming close to the surface 1a of the array substrate 1 in a part arranged inside each of the sub-pixels SPix in a plan view, so that an oriented film 21 formed on the surface 1a can be prevented or inhibited from being damaged.

In the first modification example, the spacer section 7a extends in the X-axis direction, unlike in the first embodiment. In the first modification example, the spacer section 7a is arranged within the region provided with the extension portion 51 having a width larger than the width of the extension portion 52, unlike in the first embodiment. Therefore, a difference between the width of the extension portion 51 and the width WD1 of the spacer section 7a in the Y-axis direction is larger than that in the first embodiment. Thus, if an accuracy in shape of the width WD1 is not obtained depending on a manufacturing condition such as an exposure method for forming the spacer section 7a, a light shielding portion for spacer section need not be provided. Therefore, an opening ratio in a display region can be more improved than in the first embodiment (the same is true for each of the modification examples of the first embodiment, and a second embodiment and subsequent embodiments).

<Second Modification Example of Arrangement of Auxiliary Wiring and Spacer Section>

A second modification example of the arrangement of the auxiliary wiring and the spacer section in the liquid crystal display according to the first embodiment will be described below with reference to FIG. 6.

Figure 6:
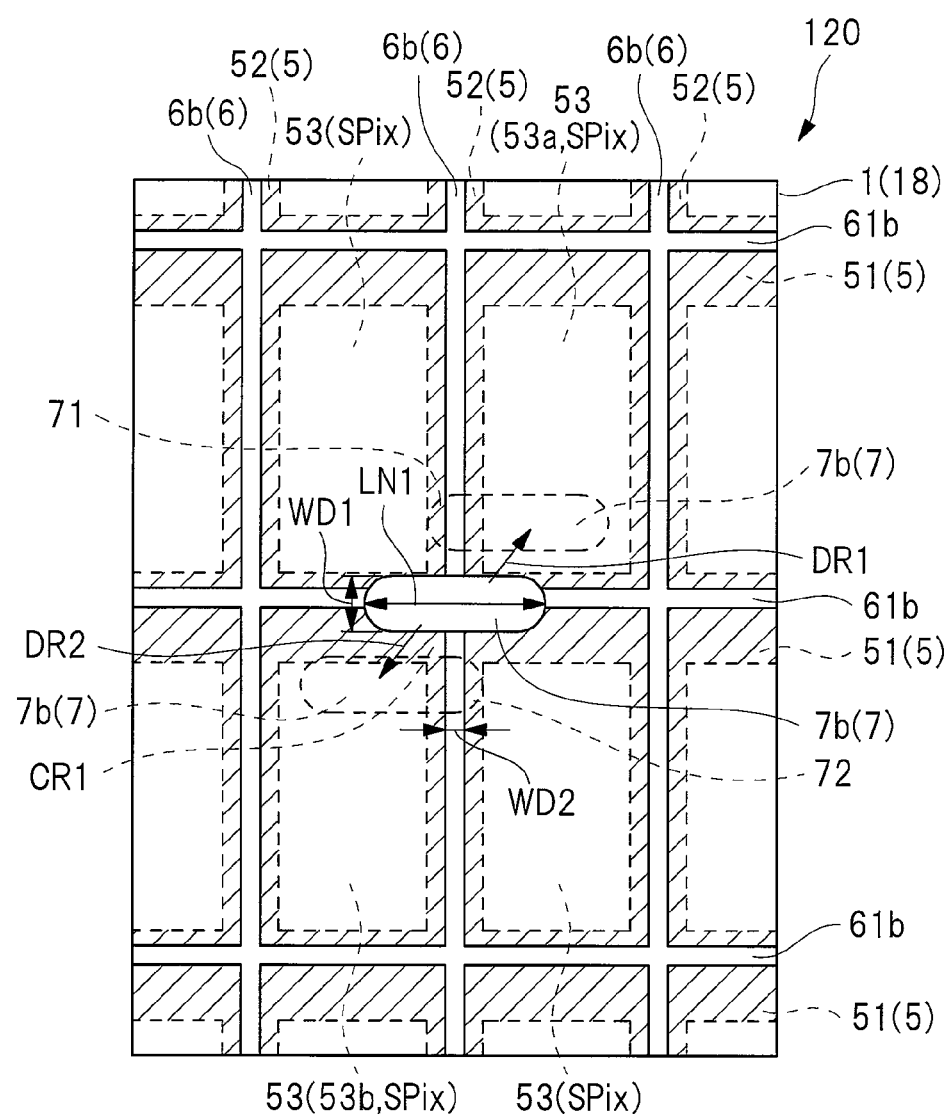
FIG. 6 is a plan view illustrating a second modification example of the liquid crystal display according to the first embodiment.

FIG. 6 is a plan view illustrating the second modification example of the liquid crystal display according to the first embodiment. FIG. 6 illustrates a state where a liquid crystal display is seen through by removing a part, other than a light shielding section 5 and a spacer section 7b, of an opposite substrate 3 and a liquid crystal layer 4. In FIG. 6, illustration of a part of an array substrate 1 is omitted.

In the liquid crystal display 120 in the second modification example, common electrodes 18 are continuously and integrally provided to respectively overlap a plurality of sub-pixels SPix arranged in a matrix shape in an X-axis direction and a Y-axis direction, for example, in a plan view. Therefore, the common electrodes 18 are provided to respectively overlap a plurality of pixel electrodes 20 arranged in a matrix shape in the X-axis direction and the Y-axis direction, for example, in a plan view.

In the second modification example, auxiliary wirings 61b are respectively arranged within regions provided with each of a plurality of extension portions 51, and auxiliary wirings 6b serving as auxiliary wirings 6 are respectively arranged within regions provided with each of a plurality of extension portions 52 in a plan view. That is, the plurality of auxiliary wirings 61b extend in the X-axis direction, and are arranged apart from one another in the Y-axis direction. The plurality of auxiliary wirings 6b extend in the Y-axis direction, and are arranged apart from one another in the X-axis direction. The plurality of auxiliary wirings 61b and the plurality of auxiliary wirings 6b are electrically connected to the common electrodes 18.

Each of the plurality of auxiliary wirings 61b is provided to project toward the side of the opposite substrate 3 from a surface 1a of the array substrate 1, like the auxiliary wirings 6 illustrated in FIG. 3. Each of the plurality of auxiliary wirings 6b is provided to project toward the side of the opposite substrate 3 from the surface 1a of the array substrate 1, like the auxiliary wirings 6 illustrated in FIG. 3. The plurality of auxiliary wirings 61b are arranged to respectively cross the plurality of auxiliary wirings 6b in a plurality of crossing regions where the plurality of extension portions 51 and the plurality of extension portions 52 cross each other in a plan view.

On the other hand, in the second modification example, the spacer section 7b serving as a spacer section 7 is provided. The spacer section 7b has a shape having a length in the X-axis direction, e.g., an elliptical shape or a rectangular shape in a plan view, like in the first modification example of the first embodiment. That is, the length LN1 of the spacer section 7b in the X-axis direction is larger than the width WD1 of the spacer section 7b in the Y-axis direction in a plan view. Any one of the plurality of auxiliary wirings 61b is arranged to cross anyone of the plurality of auxiliary wirings 6b in a crossing region CR1 where any one of the plurality of extension portions 51 and any one of the plurality of extension portions 52 cross each other, and extends in the X-axis direction in a plan view. The spacer section 7b is arranged to cross any one of the auxiliary wirings 6b in the crossing region CR1. Therefore, the length LN1 of the spacer section 7b in the X-axis direction is larger than the width WD2 of the auxiliary wiring 6b in the X-axis direction.

The spacer section 7b is provided to project toward the side of the array substrate 1 from the surface 3a of the opposite substrate 3, like the spacer section 7 illustrated in FIG. 3. The spacer section 7b is arranged within the region provided with any one of the extension portions 51 in a plan view.

As illustrated in FIG. 6, even if the spacer section 7b shifts in an oblique direction DR1 from its original position, for example, an end 71 of the spacer section 7b overlaps the auxiliary wiring 6b in a plan view. Thus, the spacer section 7b does not come close to the surface 1a of the array substrate 1 in apart arranged within an opening region 53a in a plan view. Further, even if the spacer section 7b shifts in an oblique direction DR2, for example, an end 72 of the spacer section 7b overlaps the auxiliary wiring 6b in a plan view. Thus, the spacer section 7b does not come close to the surface 1a of the array substrate 1 in a part arranged within an opening region 53b in a plan view.

Therefore, even if the array substrate 1 or the opposite substrate 3 is deflected due to application of a force from the outside, and the array substrate 1 and the opposite substrate 3 shift from each other in a transverse direction, a state where the auxiliary wiring 6b and the spacer section 7b overlap each other in a plan view is maintained. Thus, the spacer section 7 is prevented or inhibited from coming close to the surface 1a of the array substrate 1 in a part arranged inside each of the sub-pixels SPix in a plan view, so that an oriented film 21 formed on the surface 1a can be prevented or inhibited from being damaged.

In the second modification example, each of the opening regions 53, i.e., each of the sub-pixels SPix may be surrounded by the auxiliary wirings 61b and the auxiliary wirings 6b over its entire periphery, unlike in the first embodiment and the first modification example of the first embodiment. That is, in the second modification example, a projection may always be formed on the surface 1a of the array substrate 1 in a part positioned between the two adjacent sub-pixels SPix. In such a case, when the oriented film 21 is formed by a coating method, for example, a coating liquid serving as a raw material for the oriented film 21 may be unable to be uniformly applied inside each of the sub-pixels SPix. Alternatively, rubbing processing for the oriented film 21 may be unable to be uniformly performed inside each of the sub-pixels SPix.

Therefore, in the second modification example, the auxiliary wirings 61b may be provided in every other one or more, of the plurality of extension portions 51 arranged in the Y-axis direction. Alternatively, in the second modification example, the auxiliary wirings 6b may be provided in every other one or more, of the plurality of extension portions 52 arranged in the X-axis direction.

<Third Modification Example of Arrangement of Auxiliary Wiring and Spacer Section>

A third modification example of the arrangement of the auxiliary wiring and the spacer section in the liquid crystal display according to the first embodiment will be described below with reference to FIG. 7.

Figure 7:
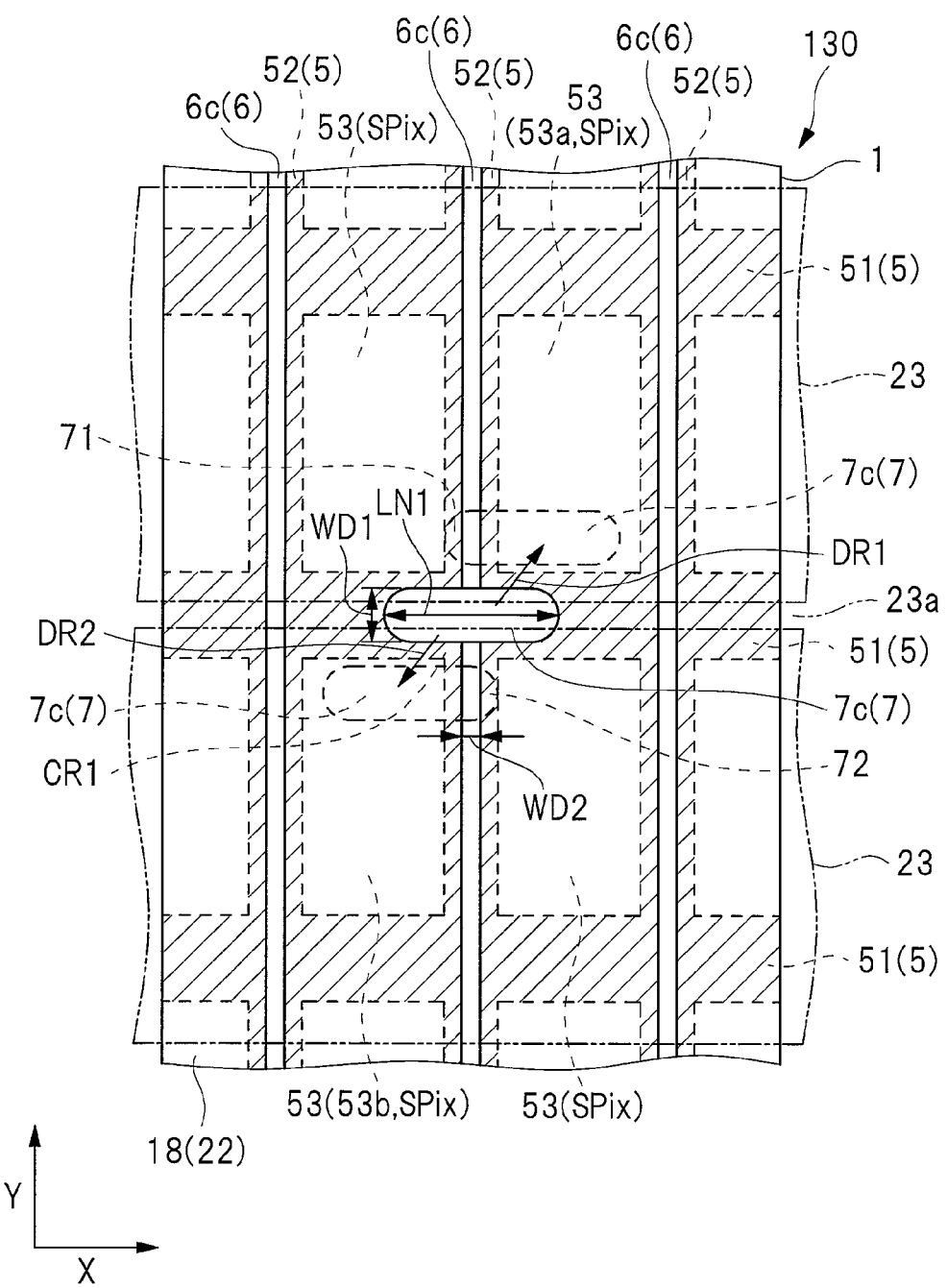
FIG. 7 is a plan view illustrating a third modification example of the liquid crystal display according to the first embodiment.

FIG. 7 is a plan view illustrating the third modification example of the liquid crystal display according to the first embodiment. FIG. 7 illustrates a state where a liquid crystal display 130 is seen through by removing a part, other than a light shielding section 5 and a spacer section 7c, of an opposite substrate 3 and a liquid crystal layer 4. In FIG. 7, illustration of a part of an array substrate 1 is omitted.

In the liquid crystal display 130 in the third modification example, common electrodes 18 are continuously and integrally provided to respectively overlap a plurality of sub-pixels SPix arranged in a Y-axis direction, for example, in a plan view. Therefore, in the third modification example, the common electrodes 18 are provided to respectively overlap a plurality of pixel electrodes 20 arranged in the Y-axis direction, for example, and extend in the Y-axis direction in a plan view, unlike in the first embodiment.

In the third modification example, auxiliary wirings 6c serving as auxiliary wirings 6 are respectively arranged within regions provided with each of a plurality of extension portions 52 in a plan view. That is, the plurality of auxiliary wirings 6c extend in the Y-axis direction, and are arranged apart from one another in an X-axis direction. The plurality of auxiliary wirings 6c are respectively electrically connected to the plurality of common electrodes 18, for example. Each of the plurality of auxiliary wirings 6c is provided to project toward the side of the opposite substrate 3 from the surface 1a of the array substrate 1, like the auxiliary wirings 6 illustrated in FIG. 3.

In the third modification example, the spacer section 7c serving as a spacer section 7 is provided. The spacer section 7c has a shape having a length in the X-axis direction, e.g., an elliptical shape or a rectangular shape in a plan view, like in the first modification example of the first embodiment. That is, the length LN1 of the spacer section 7c in the X-axis direction is larger than the width WD1 of the spacer section 7c in the Y-axis direction in a plan view. The spacer section 7c is arranged to cross any one of the auxiliary wirings 6c in a crossing region CR1 where any one of the plurality of extension portions 51 and any one of the plurality of extension portions 52 cross each other in a plan view. Therefore, the length LN1 of the spacer section 7c in the X-axis direction is larger than the width WD2 of the auxiliary wiring 6c in the X-axis direction.

The spacer section 7c is provided to project toward the side of the array substrate 1 from the surface 3a of the opposite substrate 3, like the spacer section 7 illustrated in FIG. 3. The spacer section 7c is arranged within the region provided with any one of the extension portions 51 in a plan view.

As illustrated in FIG. 7, even if the spacer section 7c shifts in an oblique direction DR1 from its original position, for example, an end 71 of the spacer section 7c overlaps the auxiliary wiring 6c in a plan view. Thus, the spacer section 7c does not come close to the surface 1a of the array substrate 1 in apart arranged within an opening region 53a in a plan view. Further, even if the spacer section 7c shifts in an oblique direction DR2, for example, an end 72 of the spacer section 7c overlaps the auxiliary wiring 6c in a plan view. Thus, the spacer section 7c does not come close to the surface 1a of the array substrate 1 in a part arranged within an opening region 53b in a plan view.

Therefore, even if the array substrate 1 or the opposite substrate 3 is deflected due to application of a force from the outside, and the array substrate 1 and the opposite substrate 3 shift from each other in a transverse direction, a state where the auxiliary wiring 6c and the spacer section 7c overlap each other in a plan view is maintained. Thus, the spacer section 7c is prevented or inhibited from coming close to the surface 1a of the array substrate 1 in a part arranged inside each of the sub-pixels SPix in a plan view, so that an oriented film 21 formed on the surface 1a can be prevented or inhibited from being damaged.

An arrangement of the auxiliary wiring 6c and the spacer section 7c in the third modification example is also applicable to a liquid crystal display including a touch panel as an input device, i.e., a liquid crystal display with a touch detection function including a driving electrode and a detection electrode. An example in which the arrangement of the auxiliary wiring 6c and the spacer section 7c in the third modification example is applied to a liquid crystal display containing a touch panel, i.e., a liquid crystal display with a touch detection function of an in-cell type will be described below.

Figure 8:
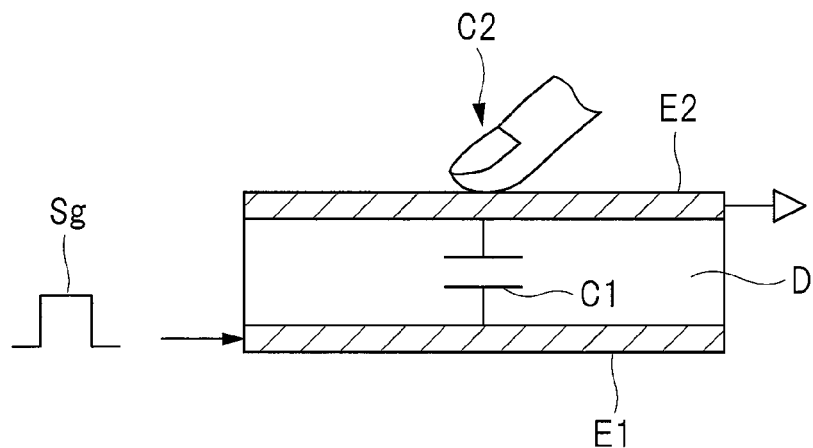
FIG. 8 is explanatory view illustrating a state where a finger has contacted and come close to a touch panel.
Figure 9:
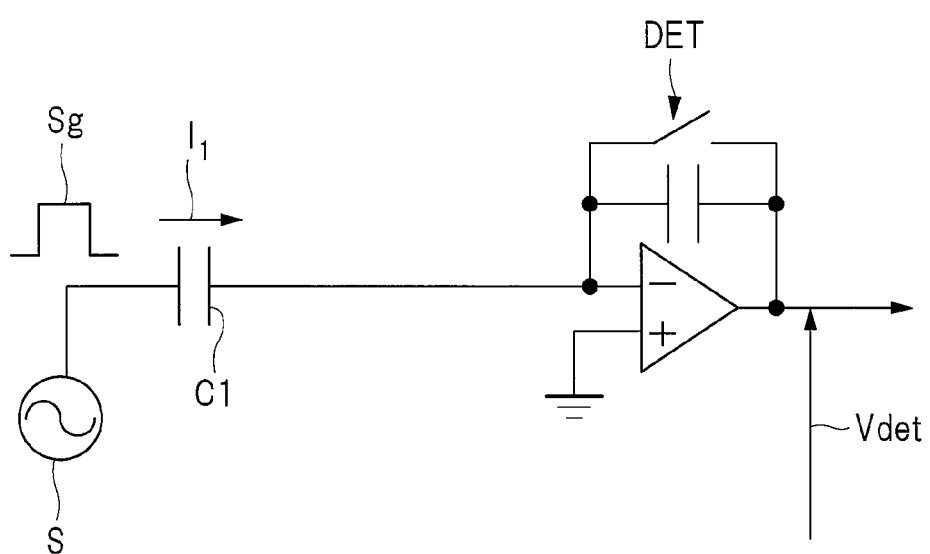
FIG. 9 is explanatory view illustrating an example of an equivalent circuit of a state where a finger has contacted and come close to the touch panel.

First, a principle of touch detection will be described with reference to FIGS. 8 and 9. FIG. 8 is explanatory view illustrating a state where a finger has contacted and come close to a touch panel. FIG. 9 is explanatory view illustrating an example of an equivalent circuit of a state where a finger has contacted and come close to the touch panel.

As illustrated in FIG. 8, in capacitance-type touch detection, the touch panel serving as an input device includes a driving electrode E1 and a detection electrode E2 oppositely arranged with a dielectric body D sandwiched therebetween. The driving electrode E1 and the detection electrode E2 constitute a capacitive element C1. As illustrated in FIG. 9, the capacitive element C1 has its end connected to an alternating current (AC) signal source S serving as a driving signal source and its other end connected to a voltage detector DET. An example of the voltage detector DET includes an integration circuit.

When an AC rectangular wave Sg having a frequency of several kilohertz to several hundred kilohertz is applied to the one end of the capacitive element C1, i.e., the driving electrode E1 from the AC signal source S, a detection signal Vdet serving as an output waveform is generated via the voltage detector DET connected to the other end of the capacitive element C1, i.e., the detection electrode E2.

In a state where the finger has neither contacted nor come close to the touch panel, i.e., in a non-contact state, a current $I_1$ corresponding to a capacitance value of the capacitive element C1 flows as the capacitive element C1 is charged or discharged, as illustrated in FIG. 9. The voltage detector DET converts a variation of the current $I_1$ corresponding to the AC rectangular wave Sg into a voltage variation.

On the other hand, in a state where the finger has contacted or come close to the touch panel, i.e., in a contact state, the capacitance value of the capacitive element C1 constituted by the driving electrode E1 and the detection electrode E2 becomes smaller upon being affected by a capacitance C2 formed by the finger. Therefore, the current $I_1$ flowing through the capacitive element C1 illustrated in FIG. 9 varies. As described above, the voltage detector DET converts the variation of the current $I_1$ corresponding to the AC rectangular wave Sg into the voltage variation. It is determined whether an absolute value of a variation amount of the voltage is larger than a reference value previously determined, for example, to determine whether the finger has contacted or come close to the touch detection device.

Figure 10:
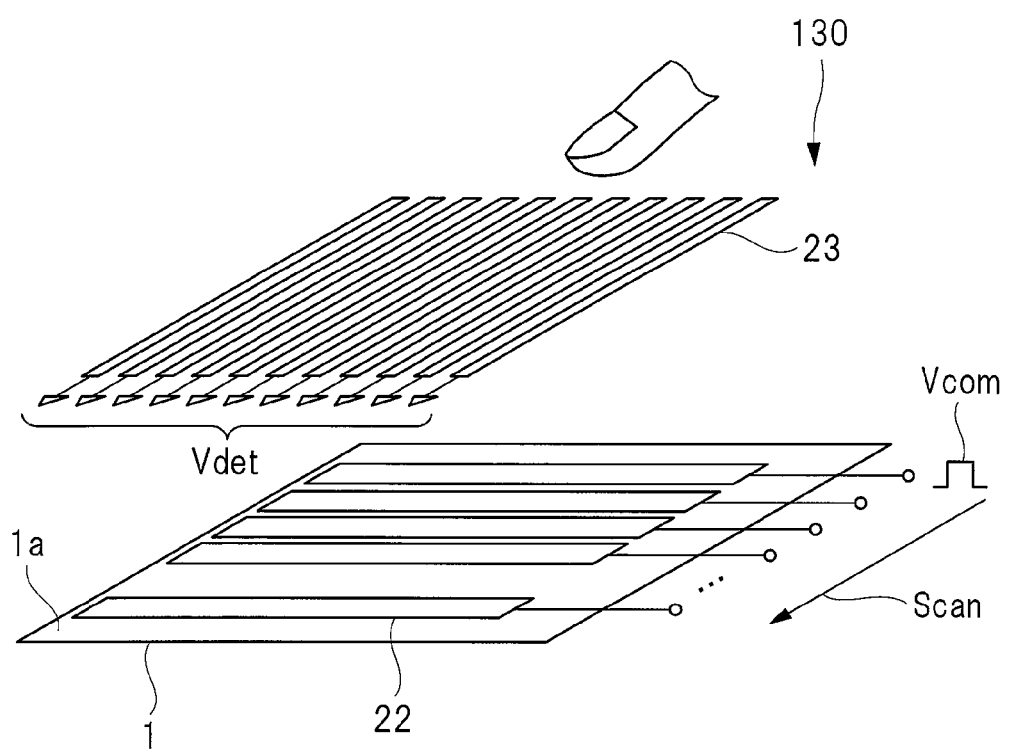
FIG. 10 is a perspective view illustrating an example of a driving electrode and a detection electrode.

FIG. 10 is a perspective view illustrating an example of a driving electrode and a detection electrode. If the liquid crystal display 130 in the third modification example is applied to a liquid crystal display with a touch detection function, as illustrated in FIG. 10, the liquid crystal display 130 includes a plurality of driving electrodes 22 and a plurality of detection electrodes 23.

The driving electrode 22 corresponds to the driving electrode E1 illustrated in FIG. 8, and corresponds to the common electrode 18 illustrated in FIG. 7. The detection electrode 23 corresponds to the detection electrode E2 illustrated in FIG. 8, and is indicated by a two-dot and dash line in FIG. 7.

As illustrated in FIG. 10, each of the plurality of detection electrodes 23 extends in a direction crossing a direction in which each of the plurality of driving electrodes 22 extends in a plan view. Each of the plurality of detection electrodes 23 opposes the driving electrode 22 in a direction perpendicular to the surface 1a of the array substrate 1. A capacitance is generated in each of a plurality of crossing parts where the plurality of driving electrodes 22 and the plurality of detection electrodes 23 cross each other. An input position is detected based on the capacitance between each of the plurality of driving electrodes 22 and each of the plurality of detection electrodes 23.

In the liquid crystal display 130 in the third modification example, the common electrode 18 is also used for both image display and touch detection. Thus, one frame period is divided into a display period and a touch detection period. In the display period, an electric field is formed between the common electrode 18 and a pixel electrode 20 by application of a voltage to the pixel electrode 20. An orientation of a liquid crystal in the liquid crystal layer changes due to the formed electric field. Thus, light transmittance in the liquid crystal layer 4 changes, so that an image is displayed.

On the other hand, in the touch detection period, the AC rectangular wave Sg (see FIG. 8) serving as a touch detection signal is applied to the common electrode 18 serving as the driving electrode 22, and a capacitance between the common electrode 18 serving as the driving electrode 22 and the detection electrode 23 changes, to detect whether the finger has contacted or come close to the touch detection device. More specifically, when a touch detection operation is performed in the touch detection period, for example, a driving electrode driver (not illustrated) sequentially selects one detection block in a scanning direction Scan. In the selected detection block, a driving signal Vcom for measuring a capacitance between the driving electrode 22 and the detection electrode 23 is input to the driving electrode 22, and a detection signal Vdet for detecting an input position is output from the detection electrode 23.

If the liquid crystal display 130 is applied to the above-described liquid crystal display with a touch detection function in the third modification example, the liquid crystal display with a touch detection function includes the plurality of common electrodes 18 extending in the Y-axis direction and arranged in the X-axis direction. In this case, the common electrodes 18 are the driving electrodes 22, and a plurality of auxiliary wirings 6c, extending in the Y-axis direction and arranged apart from one another in the X-axis direction, are respectively electrically connected to the driving electrodes 22.

The liquid crystal display with a touch detection function includes a plurality of detection electrodes 23 extending in the X-axis direction crossing the Y-axis direction serving as a direction in which each of the plurality of common electrodes 18 extends, and arranged apart from one another in the Y-axis direction, as illustrated in FIG. 7. A slit 23a is formed between the two adjacent detection electrodes 23. The detection electrode 23 is provided on the opposite side to the surface 3a of the opposite substrate 3, i.e., the reverse surface 30b of the transparent substrate 30 (see FIG. 3), for example. Each of the plurality of detection electrodes 23 may be composed of a transparent conductive material such as ITO or IZO. Alternatively, each of the plurality of detection electrodes 23 may be composed of an opaque metal such as aluminum (Al) or molybdenum (Mo).

Second Embodiment

In the liquid crystal display according to the first embodiment, the array substrate and the opposite substrate are oppositely arranged via the auxiliary wirings electrically connected to the common electrode and the spacer section. On the other hand, in a liquid crystal display according to a second embodiment, an array substrate and an opposite substrate are oppositely arranged via a detection electrode for detecting an input position and a spacer section. That is, the liquid crystal display according to the second embodiment is a liquid crystal display including a touch panel serving as an input device.

In the second embodiment, an example in which the liquid crystal display including a touch panel serving as an input device is applied to a liquid crystal display containing a touch panel, i.e., a liquid crystal display with a touch detection function of an in-cell type will be described.

A principle of touch detection in the liquid crystal display according to the second embodiment is similar to a principle of touch detection described with reference to FIGS. 8 and 9 in the third modification example of the first embodiment.
<Liquid Crystal Display>

A schematic configuration of a liquid crystal display 140 according to the second embodiment will be described below with reference to FIGS. 11 to 14.

Figure 11:
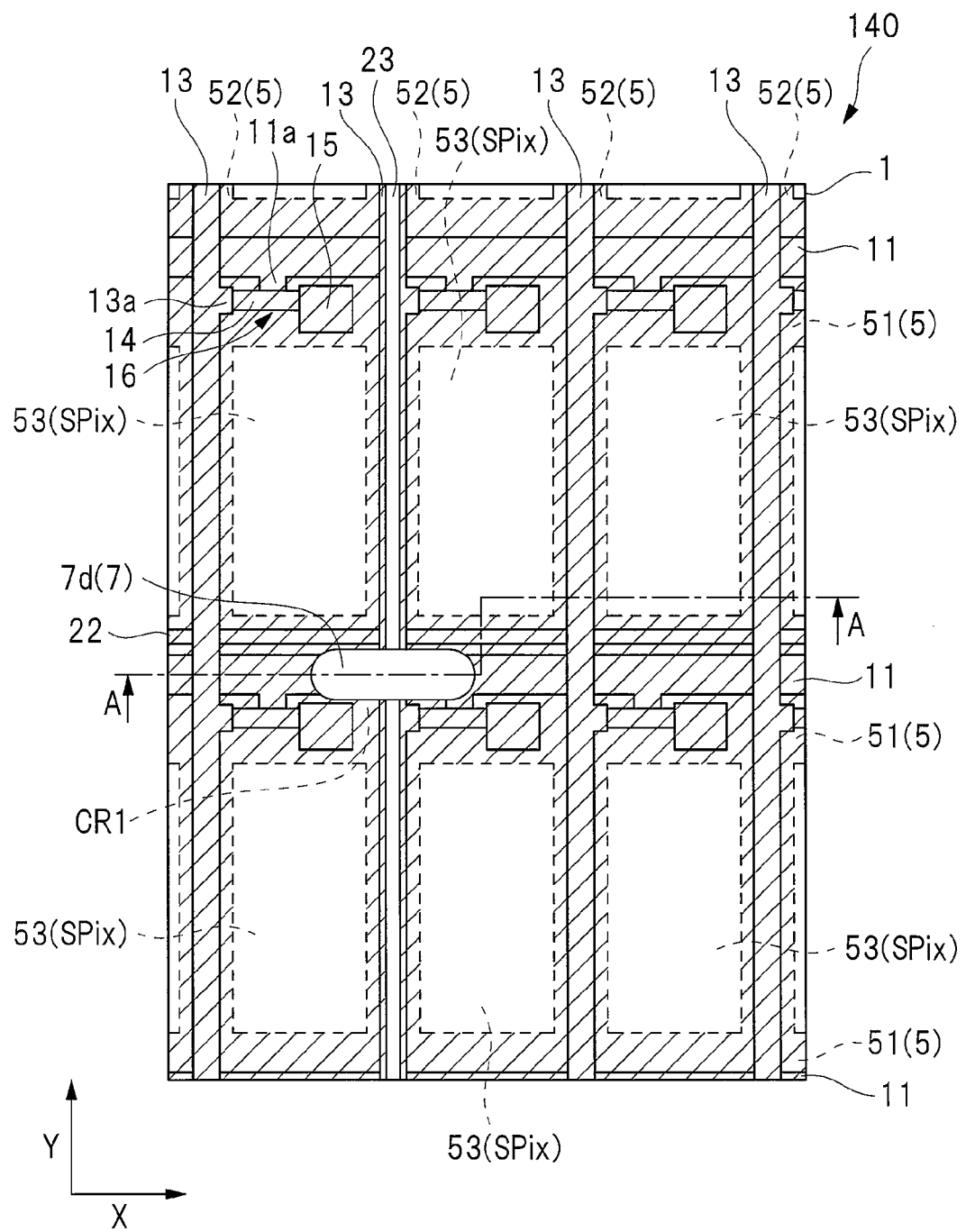
FIG. 11 is a plan view illustrating an example of a liquid crystal display according to a second embodiment.
Figure 12:
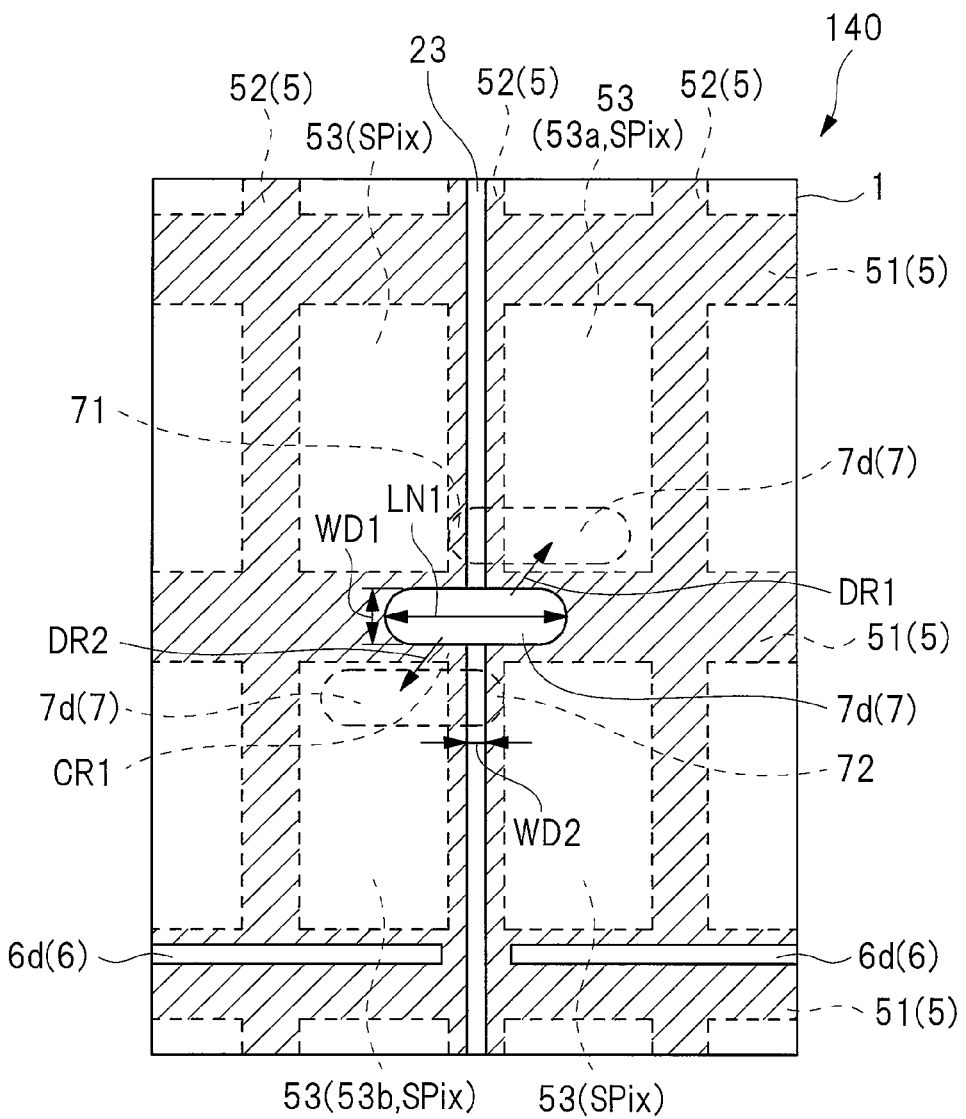
FIG. 12 is a plan view illustrating an example of the liquid crystal display according to the second embodiment.
Figure 13:
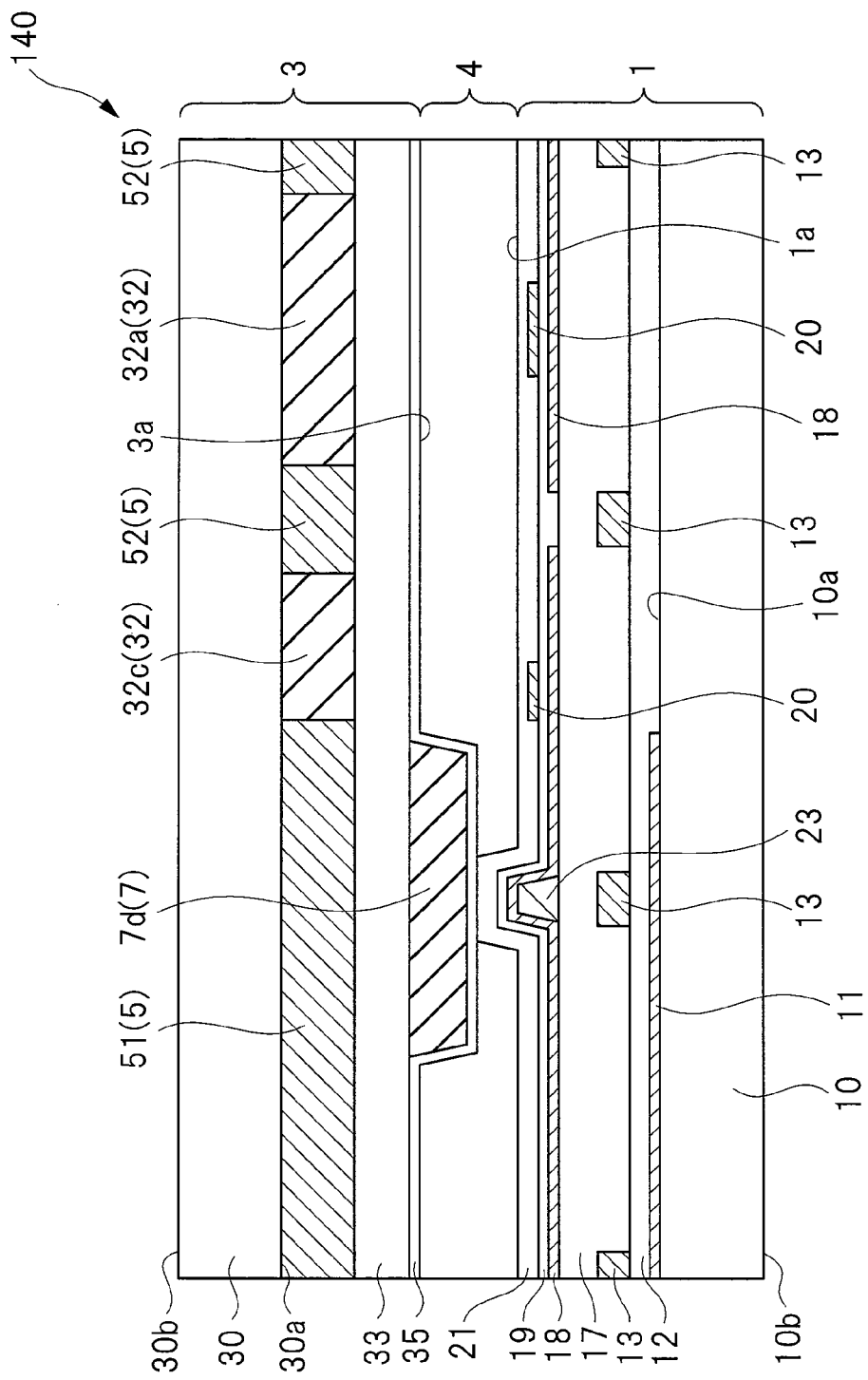
FIG. 13 is a cross-sectional view illustrating an example of the liquid crystal display according to the second embodiment.
Figure 14:
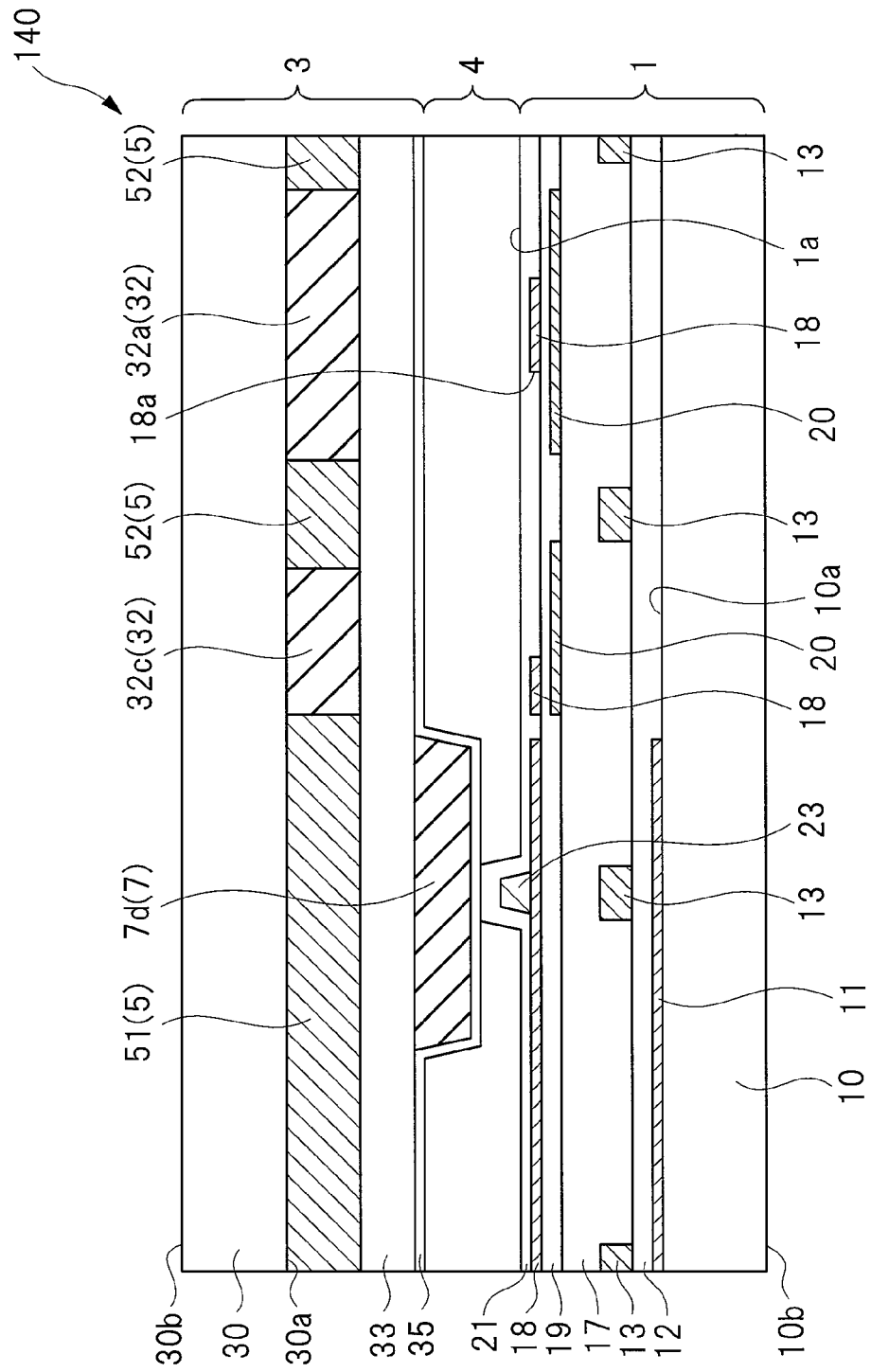
FIG. 14 is a cross-sectional view illustrating another example of the liquid crystal display according to the second embodiment.

FIGS. 11 and 12 are plan views illustrating an example of the liquid crystal display according to the second embodiment. FIG. 13 is a cross-sectional view illustrating an example of the liquid crystal display according to the second embodiment. FIG. 14 is a cross-sectional view illustrating another example of the liquid crystal display according to the second embodiment. FIGS. 13 and 14 are cross-sectional views along a line A-A illustrated in FIG. 11. FIGS. 11 and 12 illustrate a state where the liquid crystal display 140 is seen through by removing a part, other than a light shielding section 5 and a spacer section 7d, of an opposite substrate 3 and a liquid crystal layer 4. In FIGS. 11 and 12, illustration of a part of an array substrate 1 is omitted.

As illustrated in FIGS. 11 to 13, the liquid crystal display 140 according to the second embodiment includes the array substrate 1, the opposite substrate 3, and the liquid crystal layer 4, like the liquid crystal display 100 according to the first embodiment. The liquid crystal display 140 according to the second embodiment includes the light shielding section 5. The light shielding section 5 includes a plurality of extension portions 51 and a plurality of extension portions 52, like the light shielding section 5 in the first embodiment. The liquid crystal display 140 according to the second embodiment has a plurality of sub-pixels SPix. The plurality of sub-pixels SPix are respectively provided in a plurality of opening regions 53 defined by the plurality of extension portions 51 and the plurality of extension portions 52, like the plurality of sub-pixels SPix in the first embodiment.

The array substrate 1 includes a transparent substrate 10 as a base. The transparent substrate 10 in the second embodiment has a surface 10a and a reverse surface 10b, like the transparent substrate 10 in the first embodiment.

A plurality of gate wirings 11 are provided, like in the first embodiment, on the surface 10a of the transparent substrate 10. The plurality of gate wirings 11 are respectively arranged within regions provided with each of the plurality of extension portions 51, and extend in an X-axis direction in a plan view. Gate electrodes 11a extend from the gate wiring 11.

In the second embodiment, a plurality of driving electrodes 22 are provided on the surface 10a of the transparent substrate 10, unlike in the first embodiment. The plurality of driving electrodes 22 are respectively arranged within regions provided with each of the plurality of extension portions 51, and extend in the X-axis direction in a plan view. Each of the plurality of driving electrodes 22 is composed of an opaque metal such as aluminum (A) or molybdenum (Mo).

As illustrated in FIGS. 11 and 12, the driving electrodes 22 need not be respectively provided within all the regions provided with each of the plurality of extension portions 51, or may be provided in every other one or more of the regions. That is, the driving electrode 22 may be provided within the region provided with any one of the plurality of extension portions 51.

An insulating film 12 serving as a gate insulating film is provided, like in the first embodiment, to cover the gate wirings 11 and the gate electrodes 11a. However, in the second embodiment, the insulating film 12 is provided to cover the driving electrodes 22 in addition to the gate wirings 11 and the gate electrodes 11a.

A plurality of source wirings 13 are provided, like in the first embodiment, on the insulating film 12. The plurality of source wirings 13 are respectively arranged within regions provided with each of the plurality of extension portions 52, and extend in a Y-axis direction in a plan view. Source electrodes 13a extend from the source wiring 13.

A semiconductor layer 14 is provided, like in the first embodiment, on the insulating film 12 in parts respectively overlapping the gate electrodes 11a in a plan view. The above-described source electrode 13a contacts a part of the semiconductor layer 14. Drain electrodes 15 composed of the same material as that for the source wirings 13 and the source electrodes 13a are provided, like in the first embodiment, on the insulating film 12. The drain electrode 15 is arranged in close to the source electrode 13a, and partially contacts the semiconductor layer 14.

Thus, a plurality of TFTs 16 are respectively arranged in a plurality of crossing parts where the plurality of gate wirings 11 and the plurality of source wirings 13 cross each other, like in the first embodiment. Further, an interlayer resin film 17 is provided to cover the plurality of source wirings 13, the plurality of TFTs 16, and an exposed part of the insulating film 12, like in the first embodiment.

Common electrodes 18 are provided, like in the first embodiment, on the interlayer resin film 17. The common electrodes 18 are continuously and integrally provided to respectively overlap the plurality of sub-pixels SPix in a plan view. The common electrodes 18 may be continuously and integrally provided to respectively overlap the plurality of sub-pixels SPix arranged in the Y-axis direction, for example, in a plan view, which is not illustrated in FIG. 12. At this time, the common electrodes 18 are provided to respectively overlap a plurality of pixel electrodes 20 arranged in the Y-axis direction, for example, and extend in the Y-axis direction in a plan view.

A plurality of detection electrodes 23 are provided on the interlayer resin film 17. That is, the plurality of detection electrodes 23 are provided on the side of the surface 1a of the array substrate 1. Each of the plurality of detection electrodes 23 is composed of a metal film. The metal film is composed of an opaque metal such as aluminum (Al) or molybdenum (Mo).

The plurality of detection electrodes 23 are respectively arranged within the regions provided with each of the plurality of extension portions 52, and extend in the Y-axis direction in a plan view. Each of the plurality of detection electrodes 23 is provided to project toward the side of the opposite substrate 3 from the surface 1a of the array substrate 1. The surface 1a of the array substrate 1 means a surface of an oriented film 21 provided on the side of the surface 10a of the transparent substrate 10 in a part not provided with auxiliary wirings 6d.

The detection electrodes 23 need not be respectively provided within all the regions provided with each of the plurality of extension portions 52, or may be provided in every other one or more of the regions, as illustrated in FIGS. 11 and 12. That is, the detection electrode 23 may be provided within the region provided with any one of the plurality of extension portions 52 in a plan view.

In an example illustrated in FIG. 13, the common electrode 18 is provided on the detection electrode 23. Therefore, the detection electrode 23 is electrically connected to the common electrode 18. The detection electrode 23 has a lower electric resistivity than the electric resistivity of a transparent conductive material such as ITO or IZO included in the common electrode 18. Therefore, the detection electrode 23 is electrically connected to the common electrode 18, so that the electric resistance of the common electrode 18 can be reduced. Thus, the performance of the liquid crystal display can be improved, such as that a time constant can be shortened.

An inter-electrode insulating film 19 is provided, like in the first embodiment, to cover the common electrode 18.

The plurality of pixel electrodes 20 are provided, like in the first embodiment, on the inter-electrode insulating film 19. Each of the plurality of pixel electrodes 20 is composed of a transparent conductive material such as ITO or IZO. Each of the plurality of pixel electrodes 20 is provided on the side of the surface 1a of the array substrate 1 inside each of the plurality of sub-pixels SPix in a plan view. Therefore, the common electrodes 18 are provided to respectively overlap the plurality of pixel electrodes 20 arranged in the X-axis direction, for example, in a plan view. The common electrode 18 and the pixel electrode 20 oppose each other via the inter-electrode insulating film 19 inside each of the plurality of sub-pixels SPix.

The inter-electrode insulating film 19 is provided to cover the detection electrodes 23 via the common electrodes 18 within the region provided with each of the plurality of extension portions 52 in a plan view.

Although the pixel electrode 20 is provided above the common electrode 18 in the example illustrated in FIG. 13, the common electrode 18 may be provided above the pixel electrode 20. Such an example is illustrated in FIG. 14. In the example illustrated in FIG. 14, an opening 18a is formed in the common electrode 18. Further, in the example illustrated in FIG. 14, the detection electrode 23 is provided on the common electrode 18. That is, the common electrode 18 may be provided under the detection electrode 23.

An oriented film 21 is provided, like in the first embodiment, to cover the pixel electrodes 20 and an exposed part of an inter-electrode insulating film 19.

On the other hand, an opposite substrate 3 can be made similar to the opposite substrate 3 in the first embodiment, for example. That is, the opposite substrate 3 includes a transparent substrate 30 as a base. The transparent substrate 30 has a surface 30a and a reverse surface 30b. The light shielding section 5 and a color filter layer 32 are provided on the surface 30a of the transparent substrate 30. An overcoat layer 33 is provided to cover the light shielding section 5 and the color filter layer 32. A spacer section 7d serving as a spacer section 7 is provided on the overcoat layer 33. An oriented film 35 is provided to cover the spacer section 7d and the overcoat layer 33.

The array substrate 1 and the opposite substrate 3 are arranged to oppose each other, i.e., oppositely arranged via the detection electrodes 23 and the spacer section 7d. An area between the array substrate 1 and the opposite substrate 3 oppositely arranged is filled with a liquid crystal layer 4, like in the first embodiment.

By the above-described configuration, in the respective sub-pixels SPix, when the TFTs 16 are turned on, a voltage is applied to each of the plurality of pixel electrodes 20, so that an electric field is formed between the common electrode 18 and the pixel electrodes 20, and an orientation of a liquid crystal in the liquid crystal layer 4 changes due to the formed electric field, like in the first embodiment. Thus, light transmittance in the liquid crystal layer 4 changes, so that an image is displayed.

On the other hand, the liquid crystal display 140 according to the second embodiment includes the plurality of driving electrodes 22 and the plurality of detection electrodes 23, like in the third modification example of the first embodiment illustrated in FIG. 10. Each of the plurality of detection electrodes 23 extends in a direction crossing a direction in which each of the plurality of driving electrodes 22 extends in a plan view. Each of the plurality of detection electrodes 23 opposes the driving electrode 22 in a direction perpendicular to the surface 1a of the array substrate 1. A capacitance is generated in each of a plurality of crossing parts where the plurality of driving electrodes 22 and the plurality of detection electrodes 23 cross each other. An input position is detected based on the capacitance between each of the plurality of driving electrodes 22 and each of the plurality of detection electrodes 23.

In the second embodiment, auxiliary wirings 6d serving as auxiliary wirings 6 may be respectively arranged within the regions provided with each of a plurality of extension portions 51 in a plan view, as illustrated in FIG. 12. The plurality of auxiliary wirings 6d are respectively electrically connected to the plurality of common electrodes 18, for example. The auxiliary wiring 6d has a lower electric resistivity than the electric resistivity of the transparent conductive material such as ITO or IZO included in the common electrode 18. Therefore, the auxiliary wiring 6d is electrically connected to the common electrode 18, so that the electric resistance of the common electrode 18 can be reduced. Thus, the performance of the liquid crystal display can be improved, such as that a time constant can be shortened.

In such a case, the auxiliary wiring 6d is preferably composed of a conductive film formed in the same layer as a conductive film included in the detection electrode 23. Thus, the auxiliary wiring 6d can be formed in the same process as a process for forming the detection electrode 23. Therefore, the number of manufacturing processes for the liquid crystal display 140 can be reduced.

Alternatively, the driving electrode 22 is not provided separately from the gate wiring 11, and only the gate wiring 11 is provided. Thus, the gate wiring 11 can also serve as the driving electrode 22 by switching a circuit to which the gate wiring 11 is connected between a circuit for display and a circuit for detection. At this time, an input position is detected based on a capacitance between the gate wiring 11 and the detection electrode 23.

<Arrangement of Detection Electrode and Spacer Section>

An arrangement of the detection electrode and the spacer section in the liquid crystal display according to the second embodiment and its effect will be described below with reference to FIGS. 11 to 13.

As described above, the detection electrode 23 is arranged within the region provided with any one of the plurality of extension portions 52, and extends in the Y-axis direction in a plan view. The detection electrode 23 is electrically connected to the common electrode 18. Further, the detection electrode 23 is provided to project toward the side of the opposite substrate 3 from the surface 1a of the array substrate 1.

On the other hand, the spacer section 7d has a shape having a length in the X-axis direction, e.g., an elliptical shape or a rectangular shape in a plan view. That is, the length LN1 of the spacer section 7d in the X-axis direction is larger than the width WD1 of the spacer section 7d in the Y-axis direction in a plan view. The spacer section 7d is arranged to cross the detection electrode 23 in a crossing region CR1 where any one of the extension portions 52 and any one of the plurality of extension portions 51 cross each other in a plan view. Therefore, the length LN1 of the spacer section 7d in the X-axis direction is larger than the width WD2 of the detection electrode 23 in the X-axis direction.

In the second embodiment, the spacer section 7d is also provided to project toward the side of the array substrate 1 from a surface 3a of the opposite substrate 3, like in the first embodiment. The spacer section 7d is arranged within the region provided with any one of the extension portions 51 in a plan view.

As illustrated in FIG. 12, even if the spacer section 7d shifts in an oblique direction DR1 from its original position, for example, an end 71 of the spacer section 7d overlaps the detection electrode 23 in a plan view. Thus, the spacer section 7d does not come close to the surface 1a of the array substrate 1 in a part arranged within an opening region 53a. Further, even if the spacer section 7d shifts in an oblique direction DR2 from its original position, for example, an end 72 of the spacer section 7d overlaps the detection electrode 23 in a plan view. Thus, the spacer section 7d does not come close to the surface 1a of the array substrate 1 in a part arranged within an opening region 53b in a plan view.

Therefore, even if the array substrate 1 or the opposite substrate 3 is deflected due to application of a force from the outside, and the array substrate 1 and the opposite substrate 3 shift from each other in a transverse direction, a state where the detection electrode 23 and the spacer section 7d overlap each other in a plan view is maintained. Thus, the spacer section 7d is prevented or inhibited from coming close to the surface 1a of the array substrate 1 in a part arranged inside each of the sub-pixels SPix in a plan view, so that the oriented film 21 formed on the surface 1a can be prevented or inhibited from being damaged.

In the second embodiment, a process for providing a projection on the surface 1a of the array substrate 1 need not be individually performed, like in the first embodiment. Thus, the number of processes for manufacturing the liquid crystal display can be more reduced than in the technique discussed in Patent Literature 1. Further, the detection electrode 23 is composed of a metal film. Thus, a spacing between the surface 1a of the array substrate 1 and the surface 3a of the opposite substrate 3 can be more accurately maintained than when the projection provided on a surface of an array substrate is composed of an organic film in the technique discussed in Patent Literature 1, like in the first embodiment.

In the second embodiment, the detection electrode 23 and the spacer section 7d are used to prevent the spacer section 7d from coming close to the surface 1a of the array substrate 1 in the part arranged inside each of the sub-pixels SPix, even when the spacer section 7d moves in the transverse direction, like in the first embodiment. Thus, the length LN1 of the spacer section 7d in the X-axis direction is larger than the width WD1 of the spacer section 7d in the Y-axis direction. Therefore, an effect of preventing or inhibiting the spacer section 7d from coming close to the surface 1a of the array substrate 1 in the part arranged inside each of the sub-pixels SPix can be more increased than in the technique discussed in Patent Literature 2.

Third Embodiment

In the liquid crystal display according to the first embodiment, the insulating film serving as the gate insulating film is provided within the region provided with the sub-pixel. On the other hand, in a liquid crystal display according to a third embodiment, an opening is formed in an insulating film in a part overlapping a sub-pixel in a plan view, and a recess is formed on an upper surface of an interlayer resin film in the part overlapping the sub-pixel.

<Liquid Crystal Display>

A schematic configuration of a liquid crystal display according to the third embodiment will be described below with reference to FIGS. 15 to 18.

Figure 15:
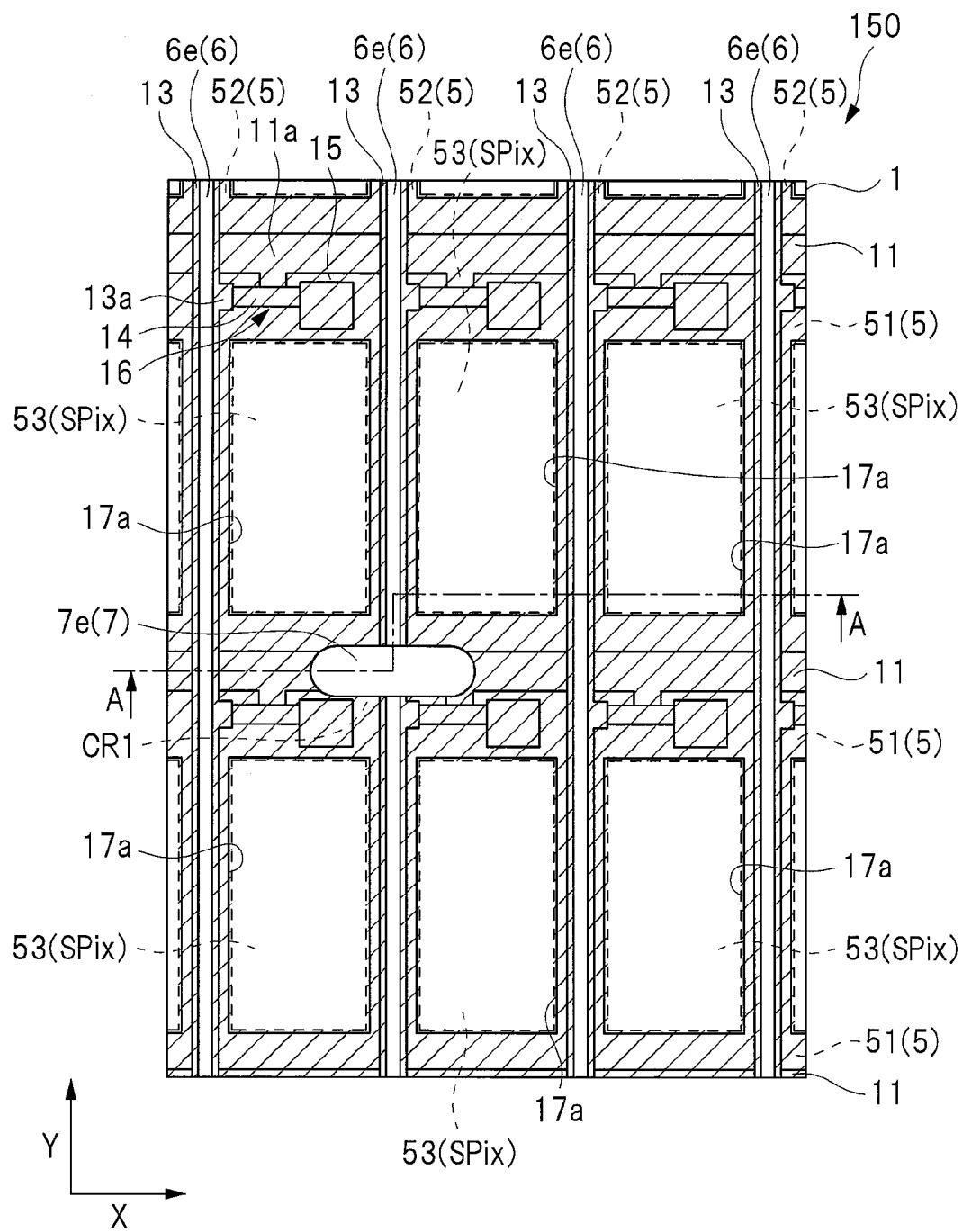
FIG. 15 is a plan view illustrating an example of a liquid crystal display according to a third embodiment.
Figure 16:
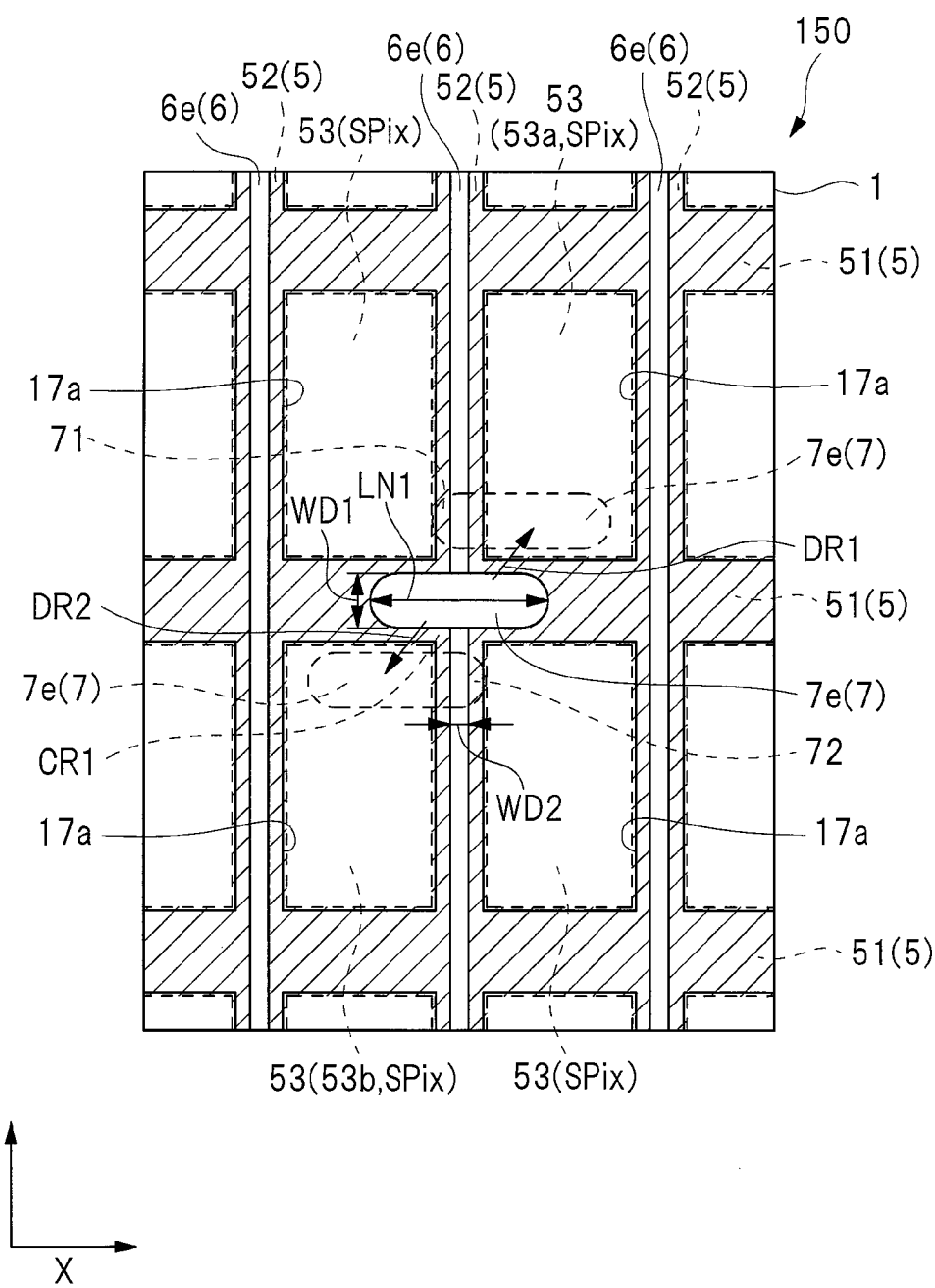
FIG. 16 is a plan view illustrating an example of the liquid crystal display according to the third embodiment.
Figure 17:
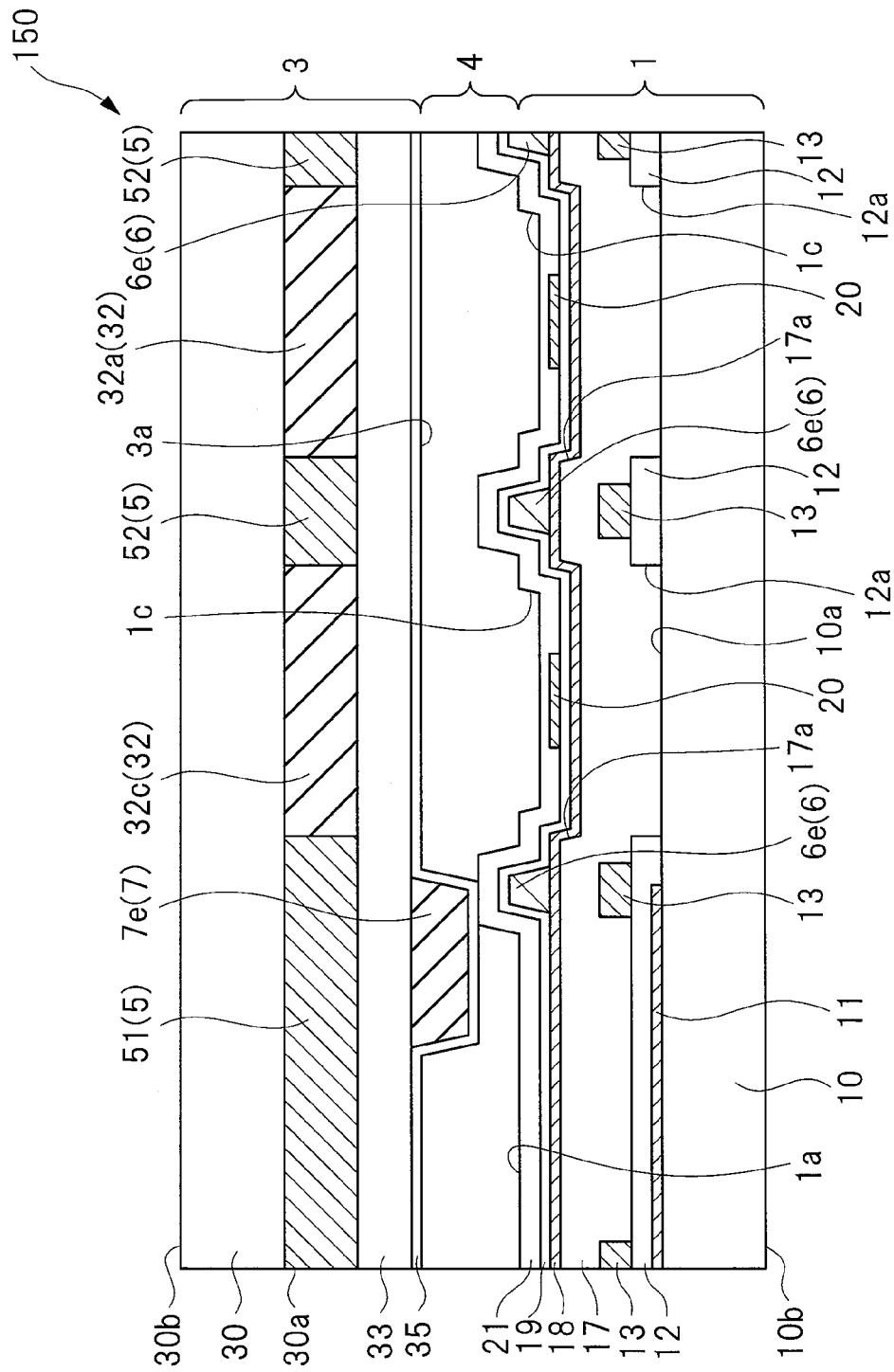
FIG. 17 is a cross-sectional view illustrating an example of the liquid crystal display according to the third embodiment.
Figure 18:
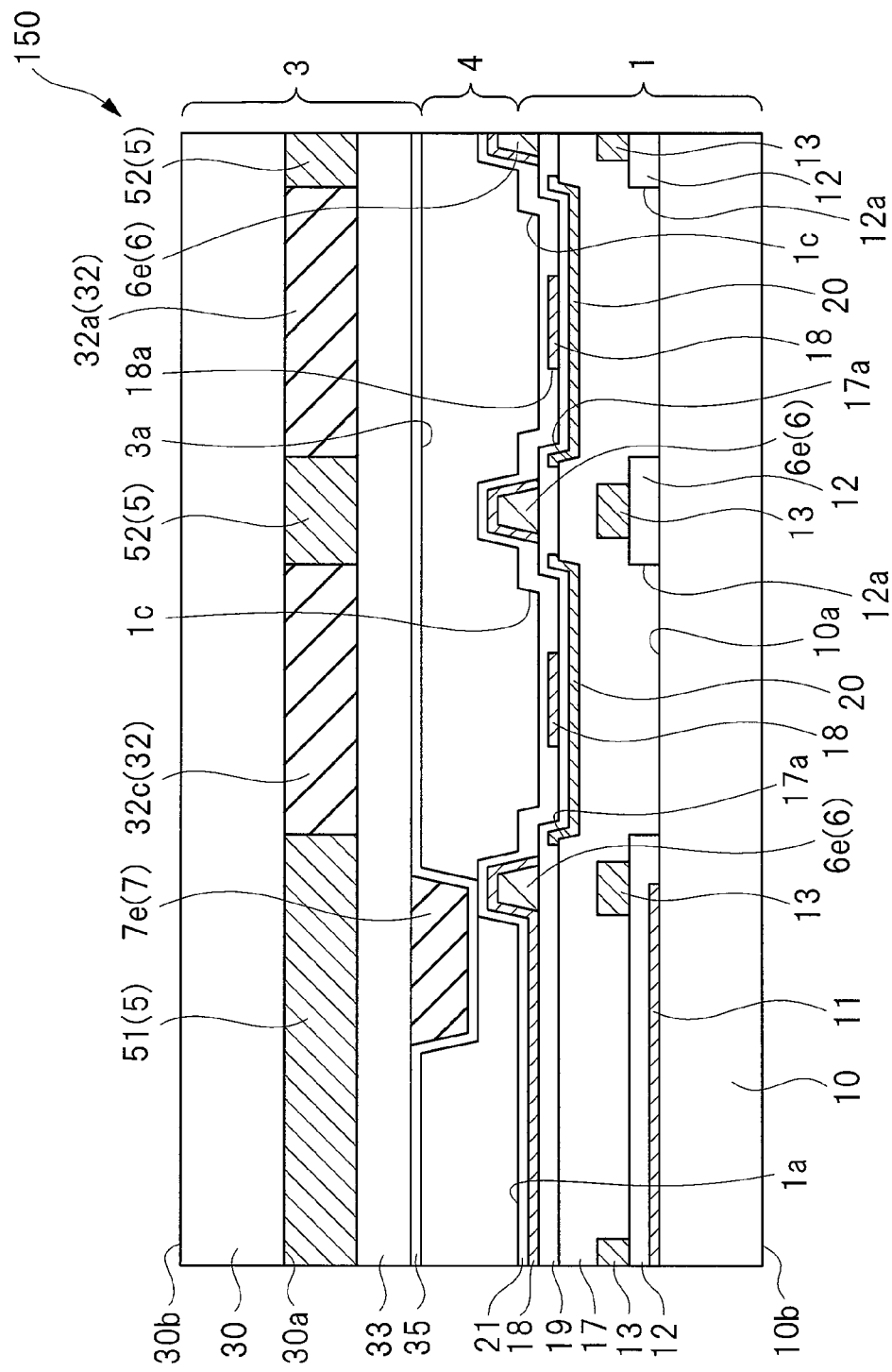
FIG. 18 is a cross-sectional view illustrating another example of the liquid crystal display according to the third embodiment.

FIGS. 15 and 16 are plan views illustrating an example of the liquid crystal display according to the third embodiment. FIG. 17 is a cross-sectional view illustrating an example of the liquid crystal display according to the third embodiment. FIG. 18 is a cross-sectional view illustrating another example of the liquid crystal display according to the third embodiment. FIGS. 17 and 18 are cross-sectional views along a line A-A illustrated in FIG. 15. FIGS. 15 and 16 illustrate a state where the liquid crystal display 150 is seen through by removing a part, other than a light shielding section 5 and a spacer section 7a, of an opposite substrate 3 and a liquid crystal layer 4. In FIGS. 15 and 16, illustration of a part of the array substrate 1 is omitted.

As illustrated in FIGS. 15 to 17, the liquid crystal display 150 according to the third embodiment includes the array substrate 1, the opposite substrate 3, and the liquid crystal layer 4, like the liquid crystal display 100 according to the first embodiment. The liquid crystal display 150 according to the third embodiment includes the light shielding section 5. The light shielding section 5 includes a plurality of extension portions 51 and a plurality of extension portions 52, like the light shielding section 5 in the first embodiment. The liquid crystal display 150 according to the third embodiment has a plurality of sub-pixels SPix. The plurality of sub-pixels SPix are respectively provided in a plurality of opening regions 53 defined by the plurality of extension portions 51 and the plurality of extension portions 52, like the plurality of sub-pixels SPix in the first embodiment.

The array substrate 1 includes a transparent substrate 10 as a base. The transparent substrate 10 in the third embodiment has a surface 10a and a reverse surface 10b, like the transparent substrate 10 in the first embodiment.

A plurality of gate wirings 11 are provided, like in the first embodiment, on the surface 10a of the transparent substrate 10. The plurality of gate wirings 11 are respectively arranged within regions provided with each of the plurality of extension portions 51, and extend in an X-axis direction in a plan view. Gate electrodes 11a extend from the gate wiring 11. An insulating film 12 serving as a gate insulating film is provided, like in the first embodiment, to cover the gate wirings 11 and the gate electrodes 11a.

A plurality of source wirings 13 are provided, like in the first embodiment, on the insulating films 12. The plurality of source wirings 13 are respectively arranged within regions provided with each of the plurality of extension portions 52, and extend in a Y-axis direction in a plan view. Source electrodes 13a extend from the source wiring 13.

A semiconductor layer 14 is provided, like in the first embodiment, on the insulating film 12 in apart overlapping the gate electrode 11a in a plan view. The source electrode 13a contacts a part of the semiconductor layer 14. Drain electrodes 15 composed of the same material as that for the source wirings 13 and the source electrodes 13a are provided, like in the first embodiment, on the insulating film 12. The drain electrode 15 is arranged in close to the source electrode 13a, and partially contacts the semiconductor layer 14. Thus, the plurality of TFTs 16 are respectively arranged in a plurality of crossing parts where the plurality of gate wirings 11 and the plurality of source wirings 13 cross each other, like in the first embodiment.

In the third embodiment, a plurality of openings 12a are respectively provided in the insulating film 12 in parts overlapping the plurality of sub-pixels SPix in a plan view. The plurality of openings 12a respectively penetrate the insulating film 12 in the parts overlapping the plurality of sub-pixels SPix to reach the surface 10a of the transparent substrate 10 in a plan view. The thickness of the insulating film 12 can be approximately 1 μm, for example. In this case, the depth of the opening 12a can be approximately 1 μm, for example.

Further, an interlayer resin film 17 is provided to be embedded in each of the plurality of openings 12a, and to cover the plurality of source wirings 13, the plurality of TFTs 16, and an exposed part of the insulating film 12. The interlayer resin film 17 is a flattening film, and is embedded in each of the plurality of openings 12a to cover the plurality of source wirings 13, the plurality of TFTs 16, and the exposed part of the insulating film 12 while flattening an uneven surface including respective upper surfaces of the plurality of source wirings 13, the plurality of TFTs 16, and the insulating film 12. The interlayer resin film 17 is composed of a transparent resin material such as a photoresist.

On the other hand, in the third embodiment, the uneven surface of the insulating film 12 by the openings 12a is not completely flattened by the interlayer resin film 17. Therefore, recesses 17a are respectively formed on an upper surface of the interlayer resin film 17 in the parts overlapping each of the plurality of sub-pixels SPix.

As described above, the depth of the opening 12a can be approximately 1 μm, for example. In this case, the depth of the recess 17a can be approximately 0.2 to 0.3 μm, for example.

Common electrodes 18 are provided, like in the first embodiment, on the interlayer resin film 17. The common electrodes 18 are continuously and integrally provided to respectively overlap the plurality of sub-pixels SPix in a plan view. The common electrodes 18 may be continuously and integrally provided to respectively overlap the plurality of sub-pixels SPix arranged in the Y-axis direction, for example, in a plan view, as illustrated in FIG. 7, which is not illustrated in FIG. 16. At this time, the common electrodes 18 are provided to respectively overlap a plurality of pixel electrodes 20 arranged in the Y-axis direction, for example, and extend in the Y-axis direction in a plan view. The common electrode 18 is provided at the bottom of the recess 17a inside each of the plurality of sub-pixels SPix.

A plurality of auxiliary wirings 6e serving as a plurality of auxiliary wirings 6 are provided on the interlayer resin film 17. Each of the plurality of auxiliary wirings 6e is composed of a metal film. The metal film is composed of an opaque metal such as aluminum (Al) or molybdenum (Mo).

The plurality of auxiliary wirings 6e are respectively arranged within regions provided with each of the plurality of extension portions 52, and extend in the Y-axis direction in a plan view. Each of the plurality of auxiliary wirings 6e is provided to project toward the side of the opposite substrate 3 from the surface 1a of the array substrate 1.

As illustrated in FIGS. 15 and 16, the auxiliary wirings 6e need not be respectively provided within all the regions provided with each of the plurality of extension portions 51, or may be provided in every other one or more of the regions. That is, the auxiliary wiring 6e may be provided within the region provided with any one of the plurality of extension portions 52.

As illustrated in FIG. 17, each of the plurality of auxiliary wirings 6e is provided on the common electrode 18 in a part overlapping any one of the plurality of extension portions 52 in a plan view. Therefore, each of the plurality of auxiliary wirings 6e is electrically connected to the common electrode 18, for example. The auxiliary wiring 6e has a lower electric resistivity than the electric resistivity of a transparent conductive material such as ITO or IZO included in the common electrode 18. Therefore, the auxiliary wiring 6e is electrically connected to the common electrode 18, so that the electric resistance of the common electrode 18 can be reduced. Thus, the performance of the liquid crystal display can be improved, such as that a time constant can be shortened.

An inter-electrode insulating film 19 is provided, like in the first embodiment, to cover the common electrode 18.

The plurality of pixel electrodes 20 are provided, like in the first embodiment, on the inter-electrode insulating film 19. Each of the plurality of pixel electrodes 20 is provided on the side of the surface 1a of the array substrate 1 inside each of the plurality of sub-pixels SPix in a plan view. Therefore, the common electrodes 18 are provided to respectively overlap the plurality of pixel electrodes 20 arranged in the X-axis direction, for example, in a plan view. The common electrode 18 is provided at the bottom of the recess 17a inside each of the plurality of sub-pixels SPix, and the common electrode 18 and the pixel electrode 20 oppose each other via the inter-electrode insulating film 19 inside each of the plurality of sub-pixels SPix.

The inter-electrode insulating film 19 is provided to cover the auxiliary wiring 6e provided on the common electrode 18 within the region provided with each of the plurality of extension portions 52 in a plan view.

Although the pixel electrode 20 is provided above the common electrode 18 in the example illustrated in FIG. 17, the common electrode 18 may be provided above the pixel electrode 20. Such an example is illustrated in FIG. 18. In the example illustrated in FIG. 18, the opening 18a is formed in the common electrode 18. Further, in the example illustrated in FIG. 18, the common electrode 18 is provided on the auxiliary wiring 6e. That is, the auxiliary wiring 6e may be provided under the common electrode 18.

An oriented film 21 is provided, like in the first embodiment, to cover the pixel electrodes 20 and an exposed part of the inter-electrode insulating film 19.

The oriented film 21 is provided to cover the inter-electrode insulating film 19 and the pixel electrode 20 at the bottom of a recess 17a inside each of the plurality of sub-pixels SPix. Recesses 1c are respectively formed in parts overlapping each of the plurality of openings 12a, in a plan view, the parts on the surface 1a of the array substrate 1 defined as an upper surface of the oriented film 21.

On the other hand, the opposite substrate 3 can be made similar to the opposite substrate 3 in the first embodiment, for example. That is, the opposite substrate 3 includes a transparent substrate 30 as a base. The transparent substrate 30 has a surface 30a and a reverse surface 30b. The light shielding section 5 and a color filter layer 32 are provided on the surface 30a of the transparent substrate 30. An overcoat layer 33 is provided to cover the light shielding section 5 and the color filter layer 32. A spacer section 7e serving as a spacer section 7 is provided on the overcoat layer 33. An oriented film 35 is provided to cover the spacer section 7d and the overcoat layer 33.

The array substrate 1 and the opposite substrate 3 are arranged to oppose each other, i.e., oppositely arranged via the auxiliary wirings 6e and the spacer section 7e. An area between the array substrate 1 and the opposite substrate 3 oppositely arranged is filled with a liquid crystal layer 4, like in the first embodiment.

By the above-described configuration, in the respective sub-pixels SPix, when the TFTs 16 are turned on, a voltage is applied to each of the plurality of pixel electrodes 20, so that an electric field is formed between the common electrode 18 and the pixel electrode 20, and an orientation of a liquid crystal in the liquid crystal layer 4 changes due to the formed electric field, like in the first embodiment. Thus, light transmittance in the liquid crystal layer 4 changes, so that an image is displayed.

<Arrangement of Auxiliary Wiring and Spacer Section>

An arrangement of the auxiliary wiring and the spacer section in the liquid crystal display according to the third embodiment and its effect will be described below with reference to FIGS. 15 to 17.

As described above, the plurality of auxiliary wirings 6e are respectively arranged within the regions provided with each of the plurality of extension portions 52, and extend in the Y-axis direction in a plan view. Each of the auxiliary wirings 6 is electrically connected to the common electrode 18. Each of The plurality of auxiliary wirings 6e is provided to project toward the side of the opposite substrate 3 from the surface 1a of the array substrate 1.

On the other hand, the spacer section 7e has a shape having a length in the X-axis direction, e.g., an elliptical shape or a rectangular shape in a plan view. That is, the length LN1 of the spacer section 7e in the X-axis direction is larger than the width WD1 of the spacer section 7e in the Y-axis direction in a plan view. The spacer section 7e is arranged to cross any one of the auxiliary wirings 6e in a crossing region CR1 where any one of the extension portions 52 and any one of the plurality of extension portions 51 cross each other in a plan view. Therefore, the length LN1 of the spacer section 7e in the X-axis direction is larger than the width WD2 of the auxiliary wiring 6e in the X-axis direction.

In the third embodiment, the spacer section 7e is also provided to project toward the side of the array substrate 1 from a surface 3a of the opposite substrate 3, like in the first embodiment. The spacer section 7e is arranged within the region provided with any one of the extension portions 51 in a plan view.

If the auxiliary wirings 6e are not provided, the array substrate 1 or the opposite substrate 3 is deflected by application of a force from the outside during processes for manufacturing the liquid crystal display or during use of the liquid crystal display, for example, so that the array substrate 1 and the opposite substrate 3 may shift from each other in a transverse direction. In such a case, the spacer section 7e comes close to the surface 1a of the array substrate 1 in a part arranged inside each of the sub-pixels SPix in a plan view. Thus, the oriented film 21 formed on the surface 1a of the array substrate 1 in the part arranged inside each of the sub-pixels SPix in a plan view may be damaged. As a result, light may leak from a damaged part of the oriented film 21.

On the other hand, in the third embodiment, the auxiliary wirings 6e are provided, as illustrated in FIG. 16. Even if the spacer section 7e shifts in an oblique direction DR1 from its original position, for example, an end 71 of the spacer section 7e overlaps the auxiliary wiring 6e in a plan view. Thus, the spacer section 7e does not come close to the side of the surface 1a of the array substrate 1 in a part arranged within an opening region 53a in a plan view. Further, even if the spacer section 7e shifts in an oblique direction DR2 from its original position, for example, an end 72 of the spacer section 7e overlaps the auxiliary wiring 6e in a plan view. Thus, the spacer 7e does not come close to the surface 1a of the array substrate 1 in a part arranged within an opening region 53b in a plan view.

Therefore, even if the array substrate 1 or the opposite substrate 3 is deflected by application of a force from the outside, and the array substrate 1 and the opposite substrate 3 shift from each other in the transverse direction, a state where the auxiliary wiring 6e and the spacer section 7e overlap each other in a plan view is maintained. Thus, the spacer section 7e is prevented or inhibited from coming close to the surface 1a of the array substrate 1 in a part arranged inside each of the sub-pixels SPix in a plan view. As a result, the oriented film 21 formed on the surface 1a can be prevented or inhibited from being damaged.

Further, in the third embodiment, recesses 1c are respectively formed in parts overlapping each of the plurality of openings 12a, in a plan view, the parts on the surface 1a of the array substrate 1, unlike in the first embodiment. Even if the array substrate 1 and the opposite substrate 3 shift from each other in the transverse direction, the spacer section 7e can be more reliably prevented or inhibited from coming close to the surface 1a of the array substrate 1 in the part arranged inside each of the sub-pixels SPix in a plan view.

In the third embodiment, a process for providing a projection on the surface 1a of the array substrate 1 need not be individually performed, like in the first embodiment. Thus, the number of processes for manufacturing the liquid crystal display can be more reduced than in the technique discussed in Patent Literature 1. Further, the auxiliary wiring 6e is composed of a metal film Thus, a spacing between the surface 1a of the array substrate 1 and the surface 3a of the opposite substrate 3 can be more accurately maintained than when a projection provided on a surface of an array substrate is composed of an organic film in the technique discussed in Patent Literature 1, like in the first embodiment.

In the third embodiment, the auxiliary wiring 6e and the spacer section 7e are used to prevent the spacer section 7e from coming close to the surface 1a of the array substrate 1 in the part arranged inside each of the sub-pixels SPix, even when the spacer section 7e moves in the transverse direction, like in the first embodiment. Thus, the length LN1 of the spacer section 7e in the X-axis direction is larger than the width WD1 of the spacer section 7e in the Y-axis direction. Therefore, an effect of preventing or inhibiting the spacer section 7e from coming close to the surface 1a of the array substrate 1 in the part arranged inside each of the sub-pixels SPix can be more increased than in the technique discussed in Patent Literature 2.

In the third embodiment, the opening 12a is formed in the insulating film 12 serving as a gate insulating film inside each of the sub-pixels SPix in a plan view, unlike in the first embodiment. Thus, in each of the sub-pixels SPix, interference of light having a specific wavelength between two adjacent layers in a multilayer film can prevent or inhibit transmitted light or reflected light from being colored, or light transmitting through the multilayer film can prevent or inhibit light transmittance from decreasing.

The third embodiment and the second embodiment can be combined with each other, although it is not illustrated. That is, in the liquid crystal display including a touch panel serving as an input device, which is described with reference to FIGS. 11 to 13 in the second embodiment, the openings 12a (see FIG. 17) may be respectively formed in the insulating film 12 in parts overlapping the plurality of sub-pixels SPix in a plan view. Thus, a similar effect to that in the third embodiment is obtained.

<First Modification Example of Arrangement of Auxiliary Wirings and Spacer Section>

A first modification example of the arrangement of the auxiliary wiring and the spacer section in the liquid crystal display according to the third embodiment will be described below with reference to FIGS. 19 to 21.

Figure 19:
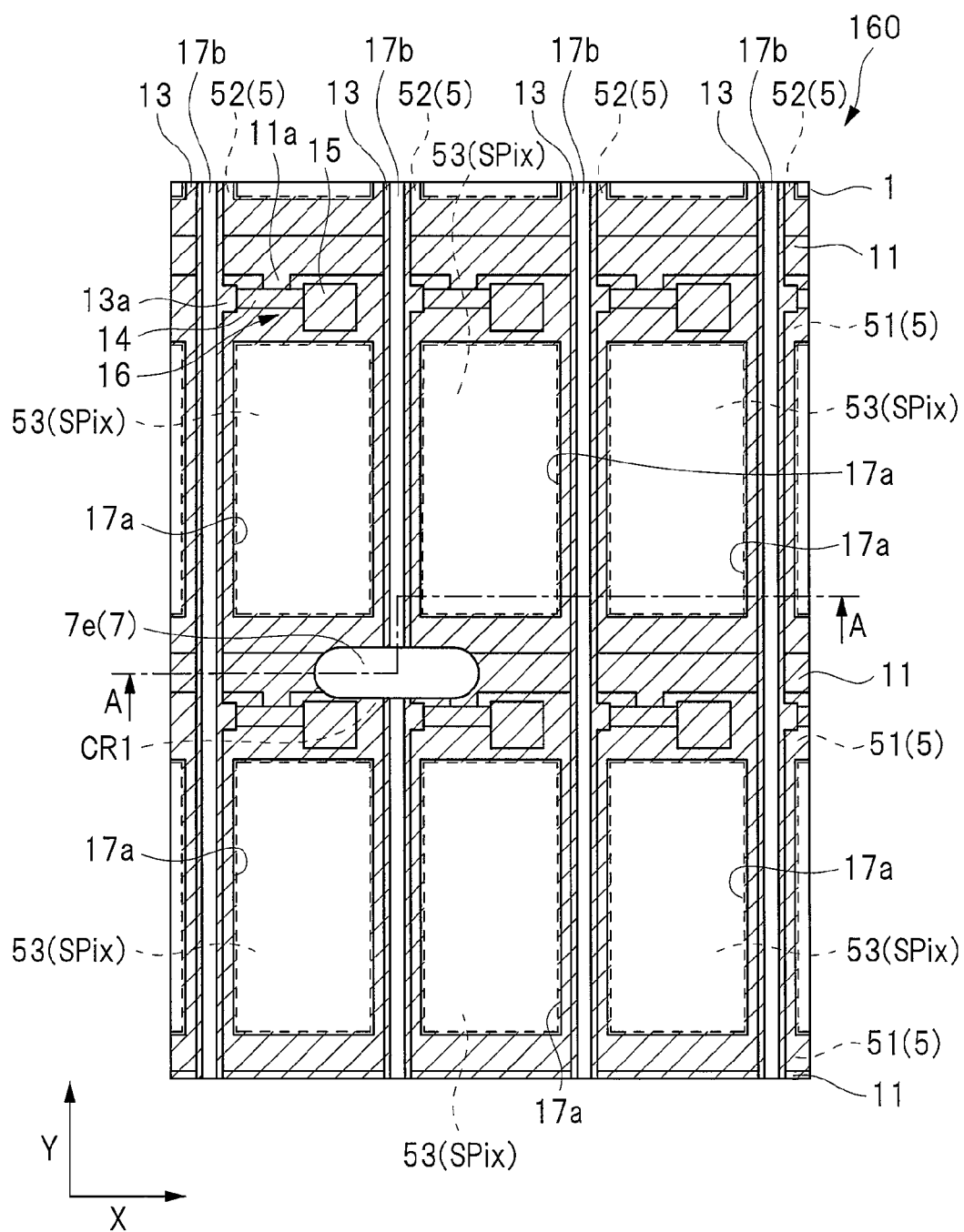
FIG. 19 is a plan view illustrating a first modification example of the liquid crystal display according to the third embodiment.
Figure 20:
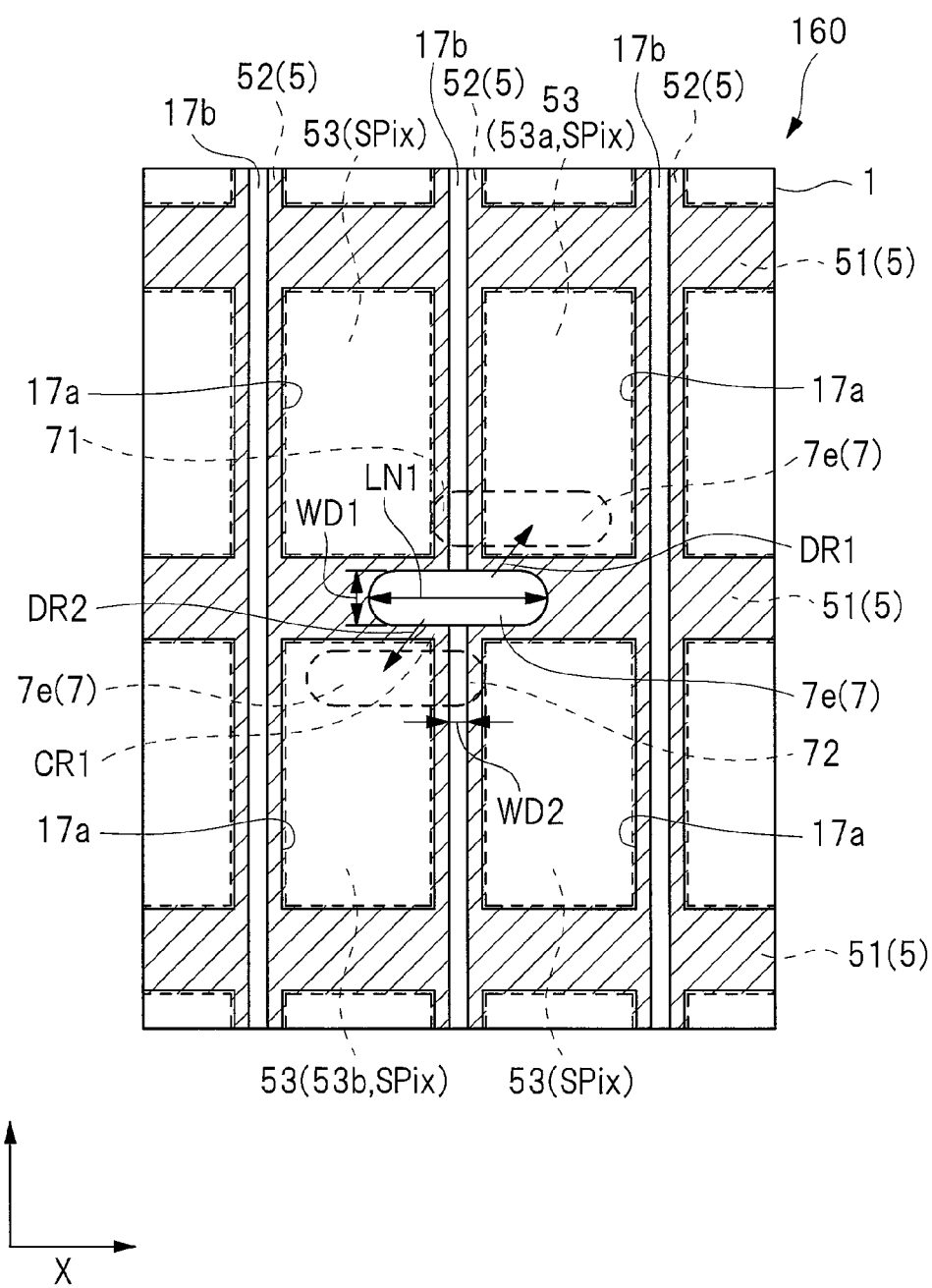
FIG. 20 is a plan view illustrating the first modification example of the liquid crystal display according to the third embodiment.
Figure 21:
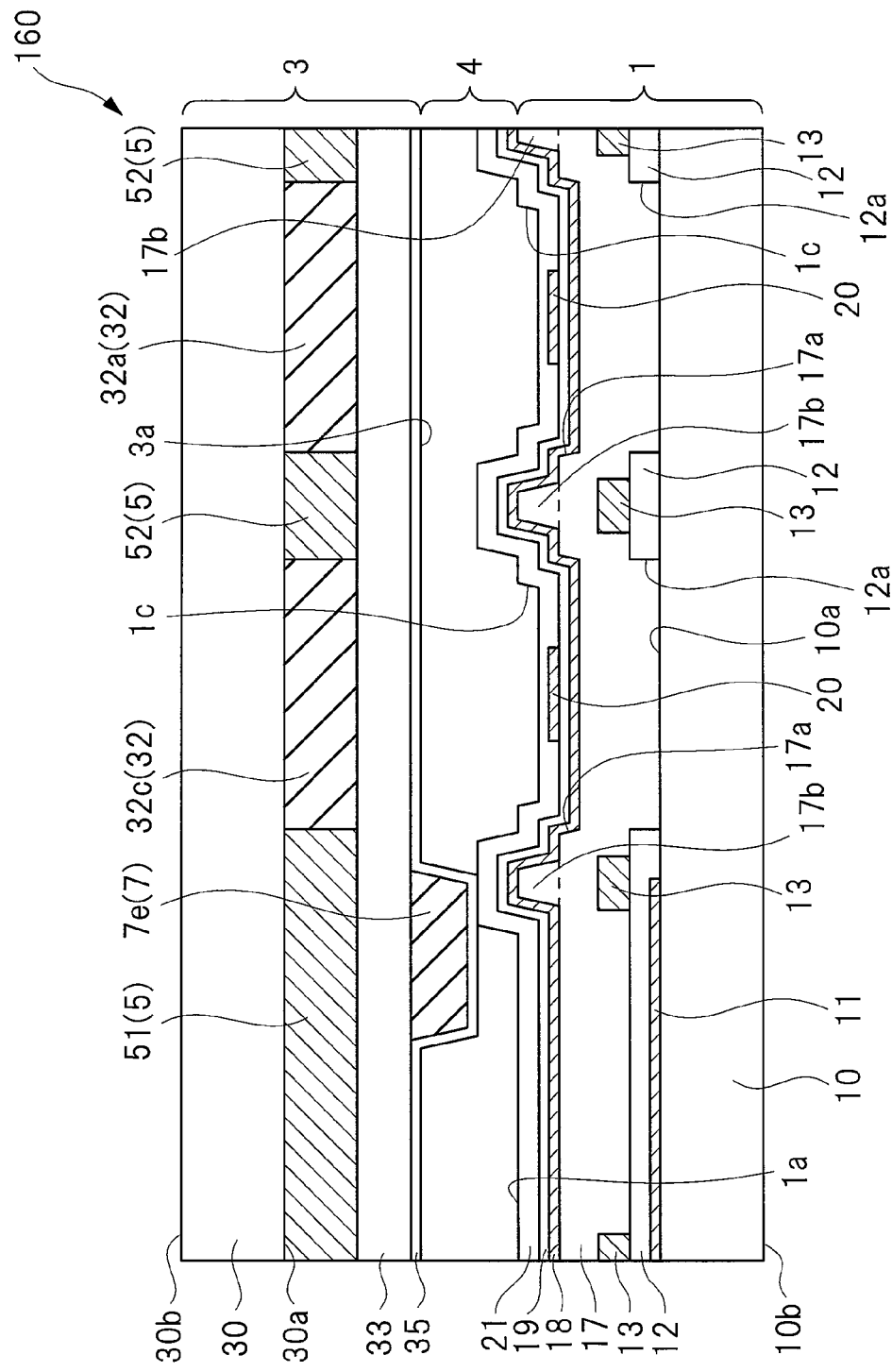
FIG. 21 is a cross-sectional view illustrating the first modification example of the liquid crystal display according to the third embodiment.

FIGS. 19 and 20 are plan views illustrating the first modification example of the liquid crystal display 150 according to the third embodiment. FIG. 21 is a cross-sectional view illustrating the first modification example of the liquid crystal display according to the third embodiment. FIG. 21 is a cross-sectional view along a line A-A illustrated in FIG. 19. FIGS. 19 and 20 illustrate a state where a liquid crystal display 160 in the first modification example is seen through by removing a part, other than a light shielding section 5 and a spacer section 7e, of an opposite substrate 3 and a liquid crystal layer 4. In FIGS. 19 and 20, illustration of a part of an array substrate 1 is omitted.

In the liquid crystal display 160 in the first modification example, openings 12a are respectively formed in an insulating film 12 in parts overlapping a plurality of sub-pixels SPix, like in the liquid crystal display 150 according to the third embodiment. Therefore, recesses 17a are respectively formed on an upper surface of an interlayer resin film 17 in parts overlapping each of the plurality of openings 12a.

On the other hand, in the first modification example, a plurality of projections 17b are provided instead of the plurality of auxiliary wirings 6e, unlike in the third embodiment. The plurality of projections 17b are respectively provided on the interlayer resin film 17 within regions provided with each of the plurality of extension portions 52 in a plan view. Therefore, the plurality of projections 17b extend in a Y-axis direction and are arranged apart from one another in an X-axis direction. Each of the plurality of projections 17b is provided to project toward the side of the opposite substrate 3 from the surface 1a of the array substrate 1.

The plurality of projections 17b can be formed by forming the interlayer resin film 17 composed of a photoresist, for example, to cover a plurality of source wirings 13, a plurality of TFTs 16, and an exposed part of the insulating film 12, and then half-etching the interlayer resin film 17 in a region other than the regions respectively provided with the plurality of extension portions 52. More specifically, by half-exposing and then developing the interlayer resin film 17 in the region other than the regions respectively provided with the plurality of extension portions 52, the plurality of projections 17b composed of the interlayer resin film 17 can be formed.

Alternatively, by forming the interlayer resin film 17 composed of a photoresist, for example, and then forming a resin film composed of acrylic resin, for example, on the interlayer resin film 17 within the regions respectively provided with the plurality of extension portions 52, the plurality of projections 17b composed of the resin film can be formed.

In the first modification example, the spacer section 7e serving as a spacer section 7 has a shape having a length in the X-axis direction, e.g., an elliptical shape or a rectangular shape in a plan view, like in the third embodiment. That is, the length LN1 of the spacer section 7e in the X-axis direction is larger than the width WD1 of the spacer section 7e in the Y-axis direction in a plan view. The spacer section 7e is arranged to cross any one of the plurality of projections 17b in a crossing region CR1 where any one of the plurality of extension portions 52 and any one of a plurality of extension portions 51 cross each other in a plan view. Therefore, the length LN1 of the spacer section 7e in the X-axis direction is larger than the width WD2 of the projection 17b in the X-axis direction.

In the first modification example, the spacer section 7e is also provided to project toward the side of the array substrate 1 from a surface 3a of the opposite substrate 3, like in the third embodiment. The spacer section 7e is arranged within a region provided with any one of the extension portions 51 in a plan view.

If the projections 17b are not provided, the array substrate 1 and the opposite substrate 3 may shift from each other in a transverse direction, like when the auxiliary wirings 6e are not provided in the third embodiment. In such a case, the spacer section 7e comes close to the surface 1a of the array substrate 1 in a part arranged inside each of the sub-pixels SPix in a plan view. Thus, the oriented film 21 formed on the surface 1a of the array substrate 1 in the part arranged inside each of the sub-pixels SPix in a plan view may be damaged.

On the other hand, in the first modification example, the projections 17b are provided, as illustrated in FIG. 20. Even if the spacer section 7e shifts in an oblique direction DR1 from its original position, for example, an end 71 of the spacer section 7e overlaps the projection 17b in a plan view. Thus, the spacer section 7e does not come close to the side of the surface 1a of the array substrate 1 in a part arranged within an opening region 53a in a plan view. Further, even if the spacer section 7e shifts in an oblique direction DR2 from its original position, for example, an end 72 of the spacer section 7e overlaps the projection 17b in a plan view. Thus, the spacer 7e does not come close to the side of the surface 1a of the array substrate 1 in a part arranged within an opening region 53b in a plan view.

Therefore, even if the array substrate 1 and the opposite substrate 3 shift from each other in the transverse direction, a state where the projection 17b and the spacer section 7e overlap each other in a plan view is maintained. Thus, the spacer section 7e is prevented or inhibited from coming close to the surface 1a of the array substrate 1 in the part arranged inside each of the sub-pixels SPix in a plan view. As a result, the oriented film 21 formed on the surface 1a can be prevented or inhibited from being damaged.

Further, in the first modification example, recesses 1c are respectively formed in parts overlapping each of the plurality of openings 12a, in a plan view, the parts on the surface 1a of the array substrate 1, like in the third embodiment. Even if the array substrate 1 and the opposite substrate 3 shift from each other in the transverse direction, the spacer section 7e can be more reliably prevented or inhibited from coming close to the surface 1a of the array substrate 1 in the part arranged inside each of the sub-pixels SPix in a plan view.

In the first modification example, to form a projection on the surface of the array substrate, the interlayer resin film formed to cover the source wirings is half-etched, leaving a part to be the projection, by half-exposing and then developing the interlayer resin film, like in the technique discussed in Patent Literature 1. Alternatively, in the first modification example, to form the projection on the surface of the array substrate, a film other than the interlayer resin film is formed as the projection on the interlayer resin film formed to cover the source wirings. Therefore, an effect of reducing the number of processes for manufacturing the liquid crystal display becomes smaller than in the third embodiment.

However, the recesses 1c formed on the surface 1a of the array substrate 1 in the first modification example are not discussed in Patent Literature 1. Even if the array substrate 1 and the opposite substrate 3 shift from each other in the transverse direction, an effect of preventing or inhibiting the spacer section 7e from coming close to the surface 1a of the array substrate 1 in the part arranged inside each of the sub-pixels SPix in a plan view becomes larger than in the technique discussed in Patent Literature 1.

In the first modification example, the projection 17b and the spacer section 7e are used to prevent the spacer section 7e from coming close to the surface 1a of the array substrate 1 in the part arranged inside each of the sub-pixels SPix, even when the spacer section 7e moves in the transverse direction. Thus, the length LN1 of the spacer section 7e in the Y-axis direction is larger than the width WD1 of the spacer section 7e in the Y-axis direction.

Therefore, an effect of preventing or inhibiting the spacer section 7e from coming close to the surface 1a of the array substrate 1 in the part arranged inside each of the sub-pixels SPix can be more increased than in the technique discussed in Patent Literature 2.

In the first modification example, the opening 12a is formed in the insulating film 12 serving as a gate insulating film inside each of the sub-pixels SPix in a plan view, like in the third embodiment. Thus, in each of the sub-pixels SPix, interference of light having a specific wavelength between two adjacent layers in a multilayer film can prevent or inhibit transmitted light or reflected light from being colored, or light transmitting through the multilayer film can prevent or inhibit light transmittance from decreasing.

Fourth Embodiment

In the first embodiment, an example in which the liquid crystal display in which the array substrate and the opposite substrate are oppositely arranged via the auxiliary wirings and the spacer section is applied to the FFS-mode liquid crystal display serving as a transverse electric field system has been described. On the other hand, in a fourth embodiment, an example in which a liquid crystal display in which an array substrate and an opposite substrate are oppositely arranged via auxiliary wirings and a spacer section is applied to an In-Plane Switching (IPS)-mode liquid crystal display serving as a transverse electric field system will be described. As described above, the transverse electric field system is a system in which a pair of electrodes is provided, while being insulated from each other, on the side of a liquid crystal layer of either one of an array substrate and an opposite substrate and an electric field to form a substantially transverse direction in the liquid crystal layer. An IPS mode is another transverse electric field system in which the pair of electrodes is arranged not to overlap each other in a plan view.

<Liquid Crystal Display>

A schematic configuration of a liquid crystal display according to the fourth embodiment will be described below with reference to FIGS. 22 to 24.

Figure 22:
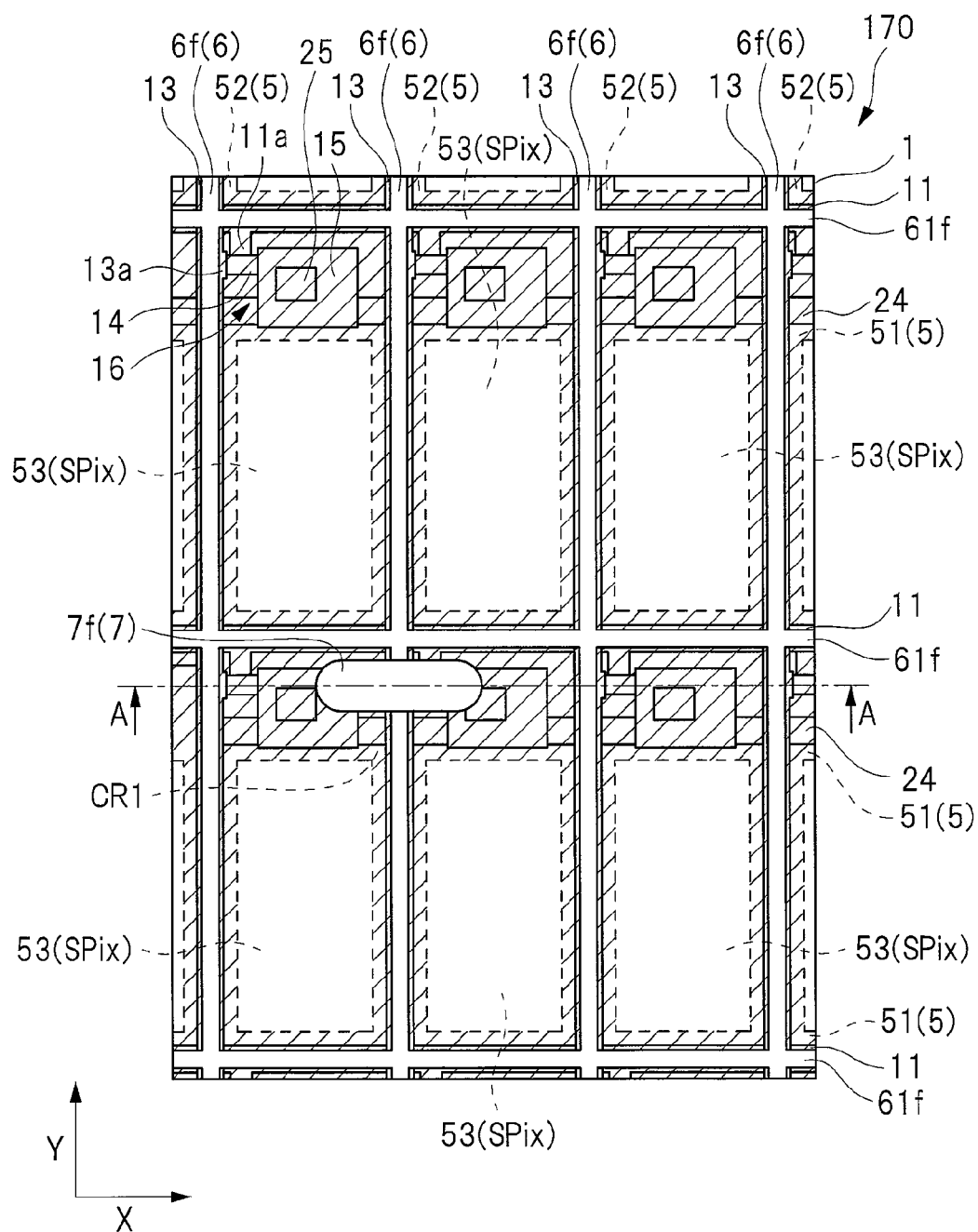
FIG. 22 is a plan view illustrating an example of a liquid crystal display according to a fourth embodiment.
Figure 23:
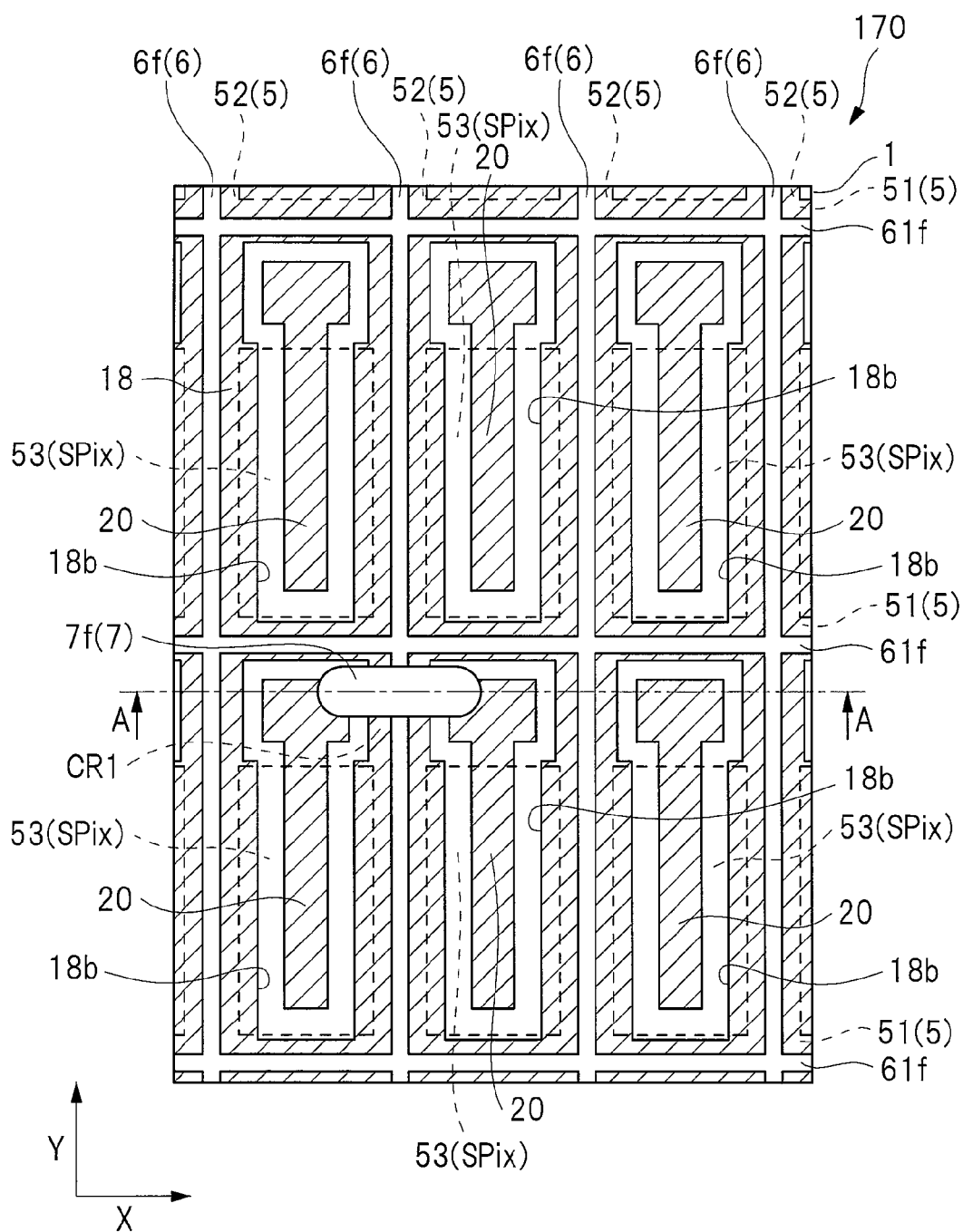
FIG. 23 is a plan view illustrating an example of a liquid crystal display according to the fourth embodiment.

FIGS. 22 and 23 are plan views illustrating an example of the liquid crystal display according to the fourth embodiment. FIG. 24 is a cross-sectional view illustrating an example of the liquid crystal display according to the fourth embodiment. FIG. 24 is a cross-sectional view along a line A-A illustrated in FIGS. 22 and 23. FIGS. 22 and 23 illustrate a state where the liquid crystal display is seen through by removing a part, other than a light shielding section 5 and a spacer section 7f, of an opposite substrate 3 and a liquid crystal layer 4. In FIGS. 22 and 23, illustration of a part of an array substrate 1 is omitted.

Figure 24:
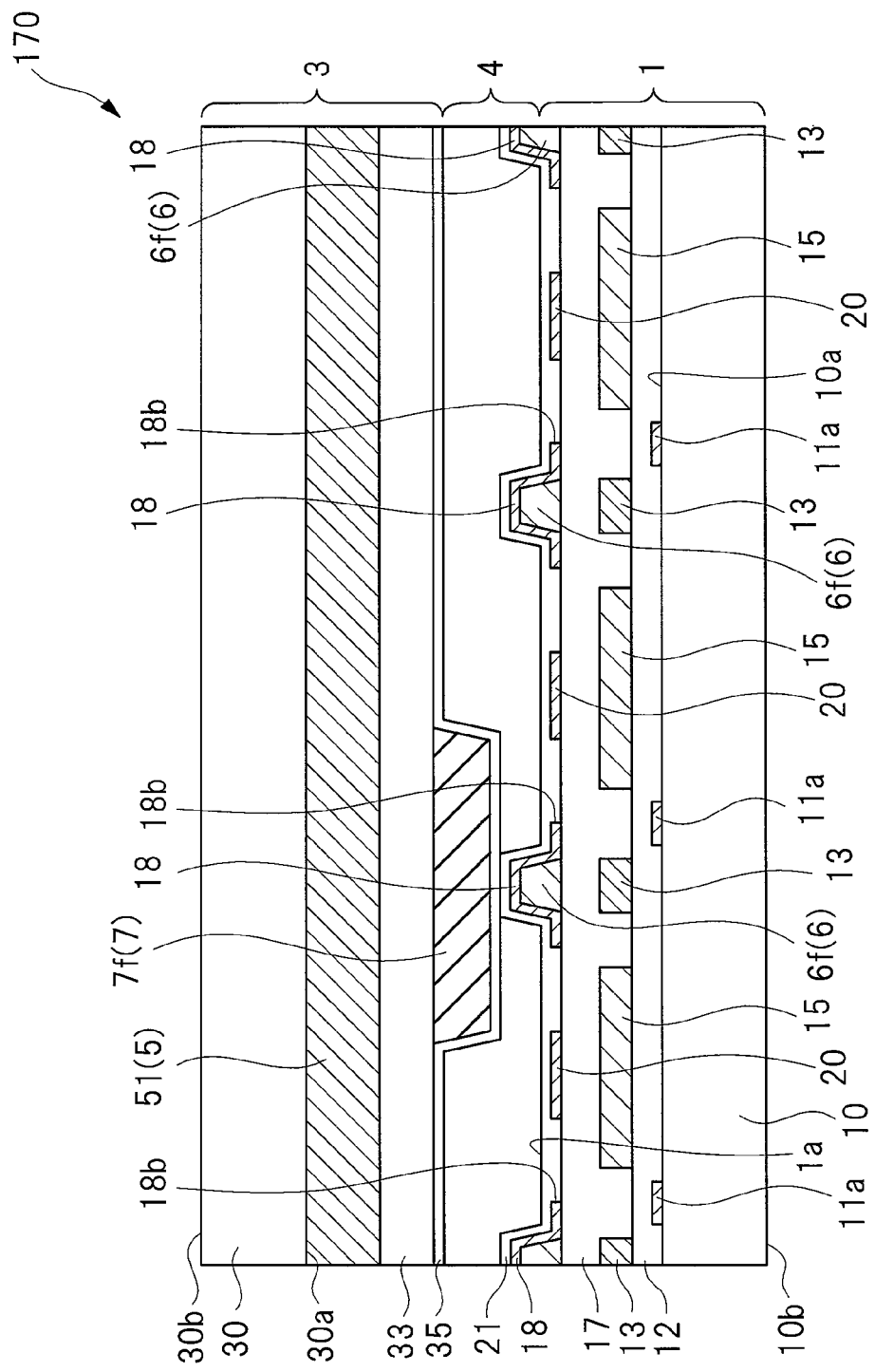
FIG. 24 is a cross-sectional view illustrating an example of the liquid crystal display according to the fourth embodiment.

As illustrated in FIGS. 22 to 24, the liquid crystal display 170 according to the fourth embodiment includes the array substrate 1, the opposite substrate 3, and the liquid crystal layer 4, like the liquid crystal display 100 according to the first embodiment. The liquid crystal display 170 according to the fourth embodiment includes the light shielding section 5. The light shielding section 5 includes a plurality of extension portions 51 and a plurality of extension portions 52, like the light shielding section 5 in the first embodiment. The liquid crystal display 170 according to the fourth embodiment has a plurality of sub-pixels SPix. The plurality of sub-pixels SPix are respectively provided in a plurality of opening regions 53 defined by the plurality of extension portions 51 and the plurality of extension portions 52, like the plurality of sub-pixels SPix in the first embodiment.

The array substrate 1 includes a transparent substrate 10 as a base. The transparent substrate 10 in the fourth embodiment has a surface 10a and a reverse surface 10b, like the transparent substrate 10 in the first embodiment.

A plurality of gate wirings 11 are provided, like in the first embodiment, on the surface 10a of the transparent substrate 10. The plurality of gate wirings 11 are respectively arranged within regions provided with each of the plurality of extension portions 51, and extend in an X-axis direction in a plan view. Gate electrodes 11a extend from the gate wiring 11.

In the fourth embodiment, a plurality of auxiliary capacitance lines 24 are provided on the surface 10a of the transparent substrate 10, unlike in the first embodiment. The plurality of auxiliary capacitance lines 24 are respectively arranged within the regions provided with each of the plurality of extension portions 51, and extend in the X-axis direction in a plan view. Each of the auxiliary capacitance lines 24 is composed of an opaque metal such as aluminum (Al) or molybdenum (Mo). The plurality of auxiliary capacitance lines 24 are wiring layers, which are electrically connected to capacitors connected to each of pixel electrodes 20 in the plurality of sub-pixels SPix.

An insulating film 12 serving as a gate insulating film is provided, like in the first embodiment, to cover the gate wirings 11 and the gate electrodes 11a. However, in the fourth embodiment, the insulating film 12 is provided to cover the auxiliary capacitance lines 24 in addition to the gate wirings 11 and the gate electrodes 11a.

A plurality of source wirings 13 are provided, like in the first embodiment, on the insulating film 12. The plurality of source wirings 13 are respectively arranged within regions provided with each of the plurality of extension portions 52, and extend in a Y-axis direction in a plan view. Source electrodes 13a extend from the source wiring 13.

A semiconductor layer 14 is provided, like in the first embodiment, on the insulating film 12 in parts respectively overlapping the gate electrodes 11a in a plan view. The above-described source electrode 13a contacts a part of the semiconductor layer 14. Drain electrodes 15 composed of the same material as that for the source wirings 13 and the source electrodes 13a are provided, like in the first embodiment, on the insulating film 12. The drain electrode 15 is arranged in close to the source electrode 13a, and partially contacts the semiconductor layer 14. Thus, a plurality of TFTs 16 are respectively arranged in a plurality of crossing parts where the plurality of gate wirings 11 and the plurality of source wirings 13 cross each other, like in the first embodiment.

Further, an interlayer resin film 17 is provided to cover the plurality of source wirings 13, the plurality of TFTs 16, and an exposed part of the insulating film 12. The interlayer resin film 17 is a flattening film, and is embedded in each of a plurality of openings 12a to cover the plurality of source wirings 13, the plurality of TFTs 16, and the exposed part of the insulating film 12 while flattening an uneven surface including respective upper surfaces of the plurality of source wirings 13, the plurality of TFTs 16, and the insulating film 12. The interlayer resin film 17 is composed of a transparent resin material such as a photoresist.

Common electrodes 18 are provided, like in the first embodiment, on the interlayer resin film 17. The common electrodes 18 are continuously and integrally provided to respectively overlap the plurality of sub-pixels SPix in a plan view. In an example illustrated in FIG. 23, the common electrodes 18 are continuously and integrally provided to respectively overlap the plurality of sub-pixels SPix arranged in a matrix shape in the X-axis direction and the Y-axis direction in a plan view. In a region provided with each of the sub-pixels SPix, an opening 18b, which penetrates the common electrode 18 to reach the interlayer resin film 17, is formed in the common electrode 18. Therefore, the common electrode 18 has a lattice shape in a plan view.

A plurality of auxiliary wirings 6f serving as a plurality of auxiliary wirings 6 are provided on the interlayer resin film 17. A plurality of auxiliary wirings 61f are provided on the interlayer resin film 17. Each of the plurality of auxiliary wirings 6f and each of the plurality of auxiliary wirings 61f are composed of a metal film The metal film is composed of an opaque metal such as aluminum (Al) or molybdenum (Mo).

The auxiliary wirings 6f are respectively arranged within the regions provided with each of the plurality of extension portions 52 in a plan view. The auxiliary wirings 61f are respectively arranged within the regions provided with each of the plurality of extension portions 51 in a plan view. Therefore, the plurality of auxiliary wirings 6f and the plurality of auxiliary wirings 61f have a lattice shape as a whole in a plan view.

The auxiliary wirings 6f need not be respectively provided within all the regions provided with each of the plurality of extension portions 52, or may be provided in every other one or more of the regions. The auxiliary wirings 61f need not be respectively provided within all the regions provided with each of the plurality of extension portions 51, or may be provided in every other one or more of the regions.

As illustrated in FIG. 24, the common electrode 18 is provided on each of the plurality of auxiliary wirings 6f. The common electrode 18 is provided on each of the plurality of auxiliary wirings 61f, which is not illustrated in FIG. 24. Therefore, the plurality of auxiliary wirings 6f and the plurality of auxiliary wirings 61f are electrically connected to the common electrodes 18. Each of the auxiliary wiring 6f and the auxiliary wiring 61f has a lower electric resistivity than the electric resistivity of a transparent conductive material such as ITO or IZO included in the common electrode 18. Therefore, the auxiliary wiring 6f and the auxiliary wiring 61f are electrically connected to the common electrode 18, so that the electric resistance of the common electrode 18 can be reduced. Thus, the performance of the liquid crystal display can be improved, such as that a time constant can be shortened.

While the common electrode 18 is provided on each of the plurality of auxiliary wirings 6f in the example illustrated in FIG. 24, each of the plurality of auxiliary wirings 6f may be provided on the common electrode 18. Similarly, each of the plurality of auxiliary wirings 61f may be provided on the common electrode 18.

The plurality of pixel electrodes 20 are provided on the interlayer resin film 17. Each of the plurality of pixel electrodes 20 is composed of a transparent conductive material such as ITO or IZO. The plurality of pixel electrodes 20 are respectively provided apart from the common electrodes 18 on the interlayer resin film 17 within regions in which the openings 18b of the common electrodes 18 are formed in a plan view. Therefore, the plurality of pixel electrodes 20 are respectively arranged at positions not overlapping the common electrodes 18 inside the sub-pixels SPix in a plan view. In other words, the common electrode 18 is provided apart from each of the plurality of pixel electrodes 20 in a plan view. Thus, an IPS-mode liquid crystal display is configured.

A contact hole 25, which penetrates an inter-electrode insulating film 19 and the interlayer resin film 17 to reach the drain electrode 15 in the TFT 16, is formed at a position overlapping the drain electrode 15, in a plan view, in the periphery of the sub-pixels SPix. The pixel electrode 20 is electrically connected to the drain electrode 15 exposed to the bottom of the contact hole 25.

For ease of understanding, illustration of the pixel electrode 20 is omitted in FIG. 22. In FIGS. 23 and 24, the pixel electrode 20 provided inside each of the sub-pixels SPix is illustrated as the one including only one extension portion extending in the Y-axis direction, for example. However, in the fourth embodiment, the pixel electrodes 20 may have a come-tooth shape including a plurality of extension portions extending in the Y-axis direction and arranged in the X-axis direction, i.e., comb teeth, for example, in a plan view. In the fourth embodiment, the common electrode 18 may also have a come-tooth shape including a plurality of extension portions extending in the Y-axis direction and arranged in the X-axis direction, i.e., comb teeth, for example, in a plan view. The comb teeth of the pixel electrode 20 and the comp teeth of the common electrode 18 may be arranged to mesh with each other. At this time, in a slit provided between the comb teeth of the pixel electrode 20 and the comb teeth of the common electrode 18, which are adjacent to each other, an electric field is formed between the pixel electrode 20 and the common electrode 18, so that an oriented state of a liquid crystal in the liquid crystal layer 4 changes.

The oriented film 21 is provided, like in the first embodiment, to cover the pixel electrodes 20, the common electrodes 18, and an exposed part of the interlayer resin film 17.

On the other hand, the opposite substrate 3 can be made similar to the opposite substrate 3 in the first embodiment, for example. That is, the opposite substrate 3 includes a transparent substrate 30 as a base. The transparent substrate 30 has a surface 30a and a reverse surface 30b. The light shielding section 5 and a color filter layer 32 (see FIG. 3) are provided on the surface 30a of the transparent substrate 30. An overcoat layer 33 is provided to cover the light shielding section 5 and the color filter layer 32. The spacer section 7f serving as a spacer section 7 is provided on the overcoat layer 33. An oriented film 35 is provided to cover the spacer section 7f and the overcoat layer 33.

The array substrate 1 and the opposite substrate 3 are arranged to oppose each other, i.e., oppositely arranged via the auxiliary wirings 6f and the spacer section 7f. An area between the array substrate 1 and the opposite substrate 3 oppositely arranged is filled with the liquid crystal layer 4, like in the first embodiment.

By the above-described configuration, in the respective sub-pixels SPix, when the TFTs 16 are turned on, an electric field is formed between the common electrode 18 and each of the pixel electrodes 20, and an orientation of liquid crystal molecules in the liquid crystal layer 4 changes, like in the first embodiment. Thus, light transmittance in the liquid crystal layer 4 changes, so that an image is displayed.

<Arrangement of Auxiliary Wiring and Spacer Section>

An arrangement of the auxiliary wiring and the spacer section in the liquid crystal display according to the fourth embodiment and its effect will be described below with reference to FIGS. 22 to 24.

As described above, the auxiliary wiring 6f is arranged within the region provided with the extension portion 52, and extends in the Y-axis direction in a plan view. The auxiliary wiring 6f is electrically connected to the common electrode 18. The auxiliary wiring 6 is provided to project toward the side of the opposite substrate 3 from the surface 1a of the array substrate 1.

On the other hand, the spacer section 7f has a shape having a length in the X-axis direction, e.g., an elliptical shape or a rectangular shape in a plan view. That is, the length of the spacer section 7f in the X-axis direction is larger than the width of the spacer section 7f in the Y-axis direction in a plan view. The spacer section 7f is arranged to cross the auxiliary wiring 6f in a crossing region CR1 where the extension portion 51 and the extension portion 52 cross each other in a plan view. Therefore, the length of the spacer section 7f in the X-axis direction is larger than the width of the auxiliary wiring 6f in the X-axis direction.

In the fourth embodiment, the spacer section 7f is also provided to project toward the side of the array substrate 1 from a surface 3a of the opposite substrate 3, like in the first embodiment. The spacer section 7f is arranged within the region provided with the extension portion 51 in a plan view.

Therefore, even if the array substrate 1 or the opposite substrate 3 is deflected by application of a force from the outside, and the array substrate 1 and the opposite substrate 3 shift from each other in a transverse direction, a state where the auxiliary wiring 6f and the spacer section 7f overlap each other in a plan view is maintained. Thus, the spacer section 7f is prevented or inhibited from coming close to the surface 1a of the array substrate 1 in a part arranged inside each of the sub-pixels SPix in a plan view. As a result, the oriented film 21 formed on the surface 1a can be prevented or inhibited from being damaged.

In the fourth embodiment, a process for providing a projection on the surface 1a of the array substrate 1 need not be individually performed, like in the first embodiment. Thus, the number of processes for manufacturing the liquid crystal display can be more reduced than in the technique discussed in Patent Literature 1. Further, the auxiliary wiring 6f is composed of a metal film Thus, a spacing between the surface 1a of the array substrate 1 and the surface 3a of the opposite substrate 3 can be more accurately maintained than when a projection provided on a surface of an array substrate is composed of an organic film in the technique discussed in Patent Literature 1, like in the first embodiment.

In the fourth embodiment, the auxiliary wiring 6f and the spacer section 7f are used to prevent the spacer section 7f from coming close to the surface 1a of the array substrate 1 in the part arranged inside each of the sub-pixels SPix, even when the spacer section 7f moves in the transverse direction, like in the first embodiment. Therefore, an effect of preventing or inhibiting the spacer section 7f from coming close to the surface 1a of the array substrate 1 in the part arranged inside each of the sub-pixels SPix can be more increased than in the technique discussed in Patent Literature 2.

In the foregoing, the invention made by the inventors of the present invention has been concretely described based on the embodiments. However, it is needless to say that the present invention is not limited to the foregoing embodiments and various modifications and alterations can be made within the scope of the present invention. It should be noted that the present invention is not particularly limited to but applicable to a medium/small-sized liquid crystal display to a large-sized liquid crystal display.

In the category of the idea of the present invention, a person with ordinary skill in the art can conceive various modified examples and revised examples, and such modified examples and revised examples are also deemed to belong to the scope of the present invention.

For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

The present invention is effective by application to a liquid crystal display.

What is claimed is:

1. A liquid crystal display comprising:
   a first substrate having a first main surface;
   a second substrate having a second main surface and arranged to oppose the first substrate so that the second main surface and the first main surface of the first substrate oppose each other;
   a liquid crystal layer sandwiched between the first main surface of the first substrate and the second main surface of the second substrate;
   a light shielding section provided to overlap the first substrate and the second substrate in a plan view and including a plurality of first extension portions extending in a first direction and a plurality of second extension portions extending in a second direction crossing the first direction in a plan view;
   a plurality of pixels defined by the plurality of first extension portions and the plurality of second extension portions in a plan view;
   a first wiring provided to project toward a side of the second substrate from the first main surface of the first substrate; and
   a spacer section provided to project toward a side of the first substrate from the second main surface of the second substrate,
   wherein the first wiring is arranged within a region provided with any one of the plurality of first extension portions, and extends in the first direction in a plan view,
   a length of the spacer section in the second direction is larger than a width of the spacer section in the first direction, and
   the spacer section is arranged to cross the first wiring in a crossing region where anyone of the plurality of second extension portions and any one of the plurality of first extension portions cross each other in a plan view.

2. The liquid crystal display according to claim 1, wherein the spacer section is arranged within a region provided with any one of the second extension portions in a plan view.

3. The liquid crystal display according to claim 1, wherein the light shielding section includes a light shielding portion for spacer section that shields the spacer section from light, and
   the spacer section is arranged within a region provided with the light shielding portion for spacer section in a plan view.

4. The liquid crystal display according to claim 1, further comprising:
   a second wiring provided to project toward a side of the second substrate from the first main surface of the first substrate,
   wherein the second wiring is arranged to cross the first wiring in the crossing region, and extends in the second direction in a plan view.

5. The liquid crystal display according to claim 1, further comprising:
   each of a plurality of first electrodes, provided on the side of the first main surface of the first substrate, inside each of a plurality of pixels arranged in the first direction among the plurality of pixels; and
   a second electrode provided on the side of the first main surface of the first substrate to overlap each of the plurality of first electrodes in a plan view, wherein the first wiring is electrically connected to the second electrode, and an electric field is formed between each of the plurality of first electrodes and the second electrode, so that an image is displayed.

6. The liquid crystal display according to claim 5, further comprising:

a plurality of gate wirings provided on the side of the first main surface of the first substrate, and extending in the first direction in a plan view;

a plurality of source wirings provided on the side of the first main surface of the first substrate, and extending in the second direction in a plan view; and a plurality of transistors respectively arranged in a plurality of crossing parts where the plurality of gate wirings and the plurality of source wirings cross each other, wherein the light shielding section is provided in the second substrate.

7. The liquid crystal display according to claim 5, further comprising:

a plurality of gate wirings provided on the side of the first main surface of the first substrate, and extending in the second direction in a plan view;

a plurality of source wirings provided on the side of the first main surface of the first substrate, and extending in the first direction in a plan view; and a plurality of transistors respectively arranged in a plurality of crossing parts where the plurality of gate wirings and the plurality of source wirings cross each other, wherein the light shielding section is provided in the second substrate.

8. The liquid crystal display according to claim 5, further comprising:

a third electrode extending in the second direction in a plan view, wherein an input position is detected based on a capacitance between the third electrode and the first wiring.

9. The liquid crystal display according to claim 1, further comprising:

a plurality of gate wirings provided on the side of the first main surface of the first substrate, and extending in the second direction in a plan view;

a first insulating film provided on the side of the first main surface of the first substrate to cover the plurality of gate wirings; and a plurality of source wirings provided on the first insulating film, and extending in the first direction in a plan view, wherein the plurality of gate wirings are respectively arranged within regions provided with each of the plurality of second extension portions in a plan view, and the plurality of source wirings are respectively arranged within regions provided with each of the plurality of first extension portions in a plan view, the liquid crystal display further comprising:

a plurality of openings respectively provided by penetrating the first insulating film in parts overlapping the plurality of pixels in a plan view;

a second insulating film provided to be embedded in each of the plurality of openings and to cover the first insulating film and the plurality of source wirings; and a plurality of recesses respectively formed on an upper surface of the second insulating film in parts overlapping each of the plurality of openings in a plan view.

10. The liquid crystal display according to claim 1, further comprising:

each of a plurality of first electrodes, provided on the side of the first main surface of the first substrate, inside each of a plurality of pixels arranged in the first direction among the plurality of pixels; and a second electrode provided on the side of the first main surface of the first substrate to overlap each of the plurality of pixels arranged in the first direction in a plan view, wherein the second electrode is provided apart from each of the plurality of first electrodes in a plan view, the first wiring is electrically connected to the second electrode, and an electric field is formed between each of the plurality of first electrodes and the second electrode, so that an image is displayed.

* * * * *